`US012243317B1`

United States Patent
Al-Azani et al.

(10) Patent No.: US 12,243,317 B1
(45) Date of Patent: Mar. 4, 2025

(54) REAL-TIME MONITORING SYSTEM FOR PERSONAL PROTECTIVE EQUIPMENT COMPLIANCE AT WORKSITES

(71) Applicant: KING FAHD UNIVERSITY OF PETROLEUM AND MINERALS, Dhahran (SA)

(72) Inventors: Sadam Al-Azani, Dhahran (SA); Hamzah Luqman, Dhahran (SA); Motaz Alfarraj, Dhahran (SA); Ala elddin Sidig, Dhahran (SA); Ayaz ul Hassan Khan, Dhahran (SA); Dina Hamed Al-Hamed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/760,119

(22) Filed: Jul. 1, 2024

(51) Int. Cl.
| | |
|---|---|
| *G06V 20/52* | (2022.01) |
| *G06Q 50/08* | (2012.01) |
| *G06V 10/764* | (2022.01) |
| *G06V 10/82* | (2022.01) |
| *G06V 20/40* | (2022.01) |
| *G06V 20/64* | (2022.01) |
| *G06V 40/10* | (2022.01) |

(52) U.S. Cl.
CPC .......... *G06V 20/52* (2022.01); *G06Q 50/08* (2013.01); *G06V 10/764* (2022.01); *G06V 10/82* (2022.01); *G06V 20/46* (2022.01); *G06V 20/64* (2022.01); *G06V 40/10* (2022.01)

(58) Field of Classification Search
CPC ...... G06V 20/52; G06V 10/764; G06V 10/82; G06V 20/46; G06V 20/64; G06V 40/10; G06Q 50/08

USPC ......................................................... 348/143
See application file for complete search history.

(56) References Cited

U.S. PATENT DOCUMENTS

| | | | |
|---|---|---|---|
| 2021/0256267 A1* | 8/2021 | Ranasinghe | ............ G01S 11/12 |
| 2022/0058381 A1 | 2/2022 | Ionescu et al. | |
| | (Continued) | | |

FOREIGN PATENT DOCUMENTS

| | | | | |
|---|---|---|---|---|
| CN | 113286175 A | | 8/2021 | |
| JP | 2024 0529955 | * | 7/2021 | ........... G06V 10/255 |

OTHER PUBLICATIONS

Soomro et al., "UCF101: A Dataset of 101 Human Actions Classes from Videos in the Wild," 2012, 7 pages (Year: 2012).*

(Continued)

*Primary Examiner* — Marnie A Matt
(74) *Attorney, Agent, or Firm* — Oblon, McClelland, Maier & Neustadt, L.L.P.

(57) ABSTRACT

A system and method for real-time monitoring of personal protective equipment (PPE) compliance at a worksite. The system includes a processor, a host memory, a graphical processing unit (GPU), a GPU memory, a storage device, an input device, a plurality of cameras, and a display device. The system creates multiple inference engines and loads input frames from the storage device for pre-processing. The pre-processed frames are processed to obtain annotations and generate an output file. The system also includes a preparatory area and an operations area with cameras configured to capture and transmit video frames. The system can process input frames at a rate of at least 15 frames per second, providing real-time PPE compliance information.

17 Claims, 19 Drawing Sheets

(56) References Cited

U.S. PATENT DOCUMENTS

| | | | |
|---|---|---|---|
| 2023/0281640 A1 | 9/2023 | Jordan et al. | |
| 2024/0054773 A1* | 2/2024 | Mansata | G06V 10/26 |
| 2024/0095534 A1* | 3/2024 | Anandkumar | G06N 3/08 |

OTHER PUBLICATIONS

He et al., "Deep Residual Learning for Image Recognition" CVPR, 2016, 9 pages (Year: 2016).*

Devlin et al., "Bert: Pre-training of Deep Bidirectional Transformers for Language Understanding," Annual Conference of North American Chapter of the Association for Computational Linguistics, 2019, 16 pages (Year: 2019).*

SHU eta al., "Encoding Robustness to Image Style via Adversarial Feature Perturbations," 2021, 12 pages (Year: 2021).*

Jiang et al., "Bongard-HOI: Benchmarking Few-Shot Visual Reasoning for Human-Object Interactions" CVPR, 2022, 10 pages (Year: 2022).*

Zou et al., "End-to-End Human Object interaction Detection with HOI transformer," CVPR, 2022, 10 pages (Year: 2022).*

Kini et al., The compliance of head-mounted industrial PPE by using deep learning object detectors. Sci Rep. Sep. 29, 2022;12(1):16347. doi: 10.1038/s41598-022-20282-9. PMID: 36175434; PMCID: PMC9523037. (Year: 2022).*

M. Imam et al., "Ensuring Miners Safety in Underground Mines Through Edge Computing: Real-Time PPE Compliance Analysis Based on Pose Estimation," in IEEE Access, vol. 12, pp. 145721-145739, 2024, doi: 10.1109/ACCESS.2024.3470558 (Year: 2024).*

V. Isailovic et al., "Compliance of head-mounted personal protective equipment by using YOLOv5 object detector," 2021 International Conference on Electrical, Computer and Energy Technologies (ICECET), Cape Town, South Africa, 2021, pp. 1-5 ( Year: 2021).*

Reyes et al., Safety Gear Compliance, CONECCT, 2022, pp. 1-6 (Year: 2022).*

Isailovic et al., The compliance of head-mounted industrial PPE by using deep learning object detectors. Sci Rep. Sep. 29, 2022 (Year: 2022).*

Lo et al. ; Real-Time Personal Protective Equipment Compliance Detection Based on Deep Learning Algorithm ; Sustainability, 15 ; Dec. 26, 2022 ; 15 Pages.

Ahmed et al. ; Personal Protective Equipment Detection: A Deep-Learning-Based Sustainable Approach ; MDPI Sustainability, 15 ; Sep. 20, 2023 ; 18 Pages.

* cited by examiner

| PPEMS | Welcome: admin | Date and Time: 2/14/2022 - 9:01:06 AM | Log out |

Monitoring settings

Camera
camera 1 ▾ ⓘ
[Add new Camera] [Delete Camera]
Confidence ⓘ
above 30%
PPE to Monitor ⓘ
☒ Helmet    ☒ Vest    ☒ No vest
Working Hours ⓘ

| | No helmet | | Vest | | No vest | |
|---|---|---|---|---|---|---|
| | From | To | From | To | From | To |
| ☒ Sun | 07:00 AM ⊙ | 03:00 PM ⊙ | 04:00 PM ⊙ | 05:00 PM ⊙ | | |
| ☒ Mon | 08:00 AM ⊙ | 12:00 PM ⊙ | 01:00 PM ⊙ | 04:00 PM ⊙ | | |
| ☒ Tue | 08:00 AM ⊙ | 12:00 PM ⊙ | 01:00 PM ⊙ | 04:00 PM ⊙ | | |
| ☒ Wed | 08:00 AM ⊙ | 12:00 PM ⊙ | 01:00 PM ⊙ | 04:00 PM ⊙ | | |
| ☒ Thur | 08:00 AM ⊙ | 12:00 PM ⊙ | 01:00 PM ⊙ | 04:00 PM ⊙ | | |
| ☐ Fri | --:-- ⊙ | --:-- ⊙ | --:-- ⊙ | --:-- ⊙ | | |
| ☒ Sat | 08:00 AM ⊙ | 12:00 PM ⊙ | 01:00 PM ⊙ | 04:00 PM ⊙ | | |

[Apply changes]

Sidebar:
- 🖥 LIVE VIDEO
- 🎛 MONITORING SETTINGS
- 🔔 ALERT MANAGEMENT
- ⚠ VIOLATION REPORTS
- 👥 SYSTEM USERS
- ✉ NOTIFICATION EMAIL PPEMS
In collaboration with:
Ministry of Energy & SDAIA

◢ JRCAI

FIG. 10

PPEMS

- LIVE VIDEO
- MONITORING SETTINGS
- ALERT MANAGEMENT
- VIOLATION REPORTS
- SYSTEM USERS
- NOTIFICATION EMAIL

Welcome: admin    Date and Time: 2/12/2023 - 8:14:44 AM    Log out

Alert Management

Send the notification by ⓘ
- ▢ Threshold    20% ▾    After 5 min ▾
- ▢ Time    1h ▾

Add emails that will receive the notification

Enter a valid email address    +Add email to the list ⓘ dina.haamed@kfupm.edu.sa    Delete

Apply changes

PPEMS
In collaboration with:
Ministry of Energy & SDAIA

JRCAI

FIG. 11

REAL-TIME MONITORING SYSTEM FOR PERSONAL PROTECTIVE EQUIPMENT COMPLIANCE AT WORKSITES

STATEMENT OF ACKNOWLEDGEMENT

Support provided by King Fahd University of Petroleum & Minerals (KFUPM), Saudi Arabia, SDAIA-KFUPM Joint Research Center for Artificial Intelligence (JRC-AI) fund (JRC-AI-UCG-01) is gratefully acknowledged.

BACKGROUND

Technical Field

The present disclosure generally relates to real-time monitoring systems for personal protective equipment (PPE) compliance at worksites. In particular, the present disclosure relates to systems and methods that utilize computer vision and machine learning techniques for detecting and classifying PPE compliance in video frames.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Making the workplace safe is an important goal for any organization. Achieving this goal requires the industrial and construction sectors to provide and monitor the use of safety equipment by workers. Personal Protective Equipment (PPE) refers to a variety of devices and garments, such as helmets, gloves, eye protection, high-visibility clothing, respiratory protective equipment (RPE), safety footwear, and safety harnesses, designed to protect workers from hazards that can cause serious workplace injuries and illnesses. These hazards can be physical, chemical, biological, radiological, or environmental in nature. The sources of site injuries and illnesses can vary from contact with chemical and mechanical hazards to construction hazards. Accordingly, PPE can be categorized into the head, body, and respiratory PPE. Head PPE is a device that help in protecting the head, face, or eyes and includes helmets, safety glasses, face shields, and head protection. Body PPE includes vests, gloves, and safety boots, whereas respiratory PPE includes respirators and gas masks.

In many industrial, construction, and energy sectors, the use of PPE is mandated by safety regulations and standards to minimize exposure to hazards. Traditionally, compliance with these regulations is monitored through manual inspections, which can be time-consuming, labor-intensive, and subject to human error. Advancements in artificial intelligence, specifically in computer vision and machine learning, have led to the development of systems that can automate the monitoring of PPE compliance. The advances in technology, including machine learning, hyper-performance computing, and cloud data storage, make it possible to develop computer-vision-based systems for several tasks, including image classification, object detection, and action recognition.

Convolutional neural network (CNN)-based architectures, such as AlexNet, VGG, EfficientNet, and ResNet remain the dominant models for developing most of the classification and detection applications. In addition, several techniques have been developed using the transformer model for natural language processing tasks. Due to the success of the transformer models, the transformer models are adapted for computer vision, as vision transformers which have outperformed other models in different tasks. Computer vision enables computers to interpret and understand the visual world, while machine learning, and particularly deep learning, allows for the creation of algorithms that can learn from data and make informed decisions. These technologies can potentially enhance the efficiency and accuracy of compliance monitoring and provide real-time feedback to improve workplace safety. Accordingly, it is one object of the present disclosure to provide methods and systems for real-time monitoring and detecting PPE compliance. Further, it is an object of the present disclosure to provide methods and systems for providing a systematic framework for developing, evaluating, and selecting the most suitable model for real-world applications.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In an exemplary embodiment, the present disclosure discloses a system for real-time personal protective equipment (PPE) compliance monitoring at a worksite. The system comprises a processor configured to execute a computer instruction, a host memory connected to the processor, a graphical processing unit (GPU) connected to the processor, a GPU memory connected to the GPU, a storage device connected to the processor, an input device configured to feed first video frames to the storage device. The system further includes a plurality cameras connected to the processor configured to feed second video frames to the storage device. In addition, the system comprises a display device connected to the processor and configured to present a PPE compliance information from the processor via a web-based dashboard.

The computer instructions when executed, cause the processor to create a plurality of inference engines each comprising an engine path, a plurality of input threads, a plurality of inference threads, and a plurality of output threads. Further, the computer instructions cause the processor to load a plurality of input frames from the storage device to the plurality of inference engines to pre-process and enqueue the plurality of input frames to an input queue by the plurality of input threads. The computer instructions also cause the processor to process a plurality of pre-processed input frames from the input queue to obtain an annotation and to enqueue a plurality of processed frames with the annotation to an output queue by the plurality of inference threads. In addition, the computer instructions cause the processor to generate an output file comprising the plurality of processed frames and the annotation by the plurality of output threads and destroy the plurality of input threads, the plurality of inference threads, and the plurality of output threads.

In an exemplary embodiment, the system comprises a preparatory area and an operations area. The preparatory area is enclosed by least three vertical walls and a roof and includes the input device. The input device comprises a first set of cameras of the plurality cameras wirelessly connected to the processor, configured to capture reference video frames, and configured to transmit the reference video frames to the storage device. The first set of cameras includes a face level camera and a complete body camera. Further, the operations area is proximal to, adjacent or open to the preparatory area, has a second set of cameras of the plurality of cameras wirelessly connected to the processor, configured to capture working video frames, and configured to transmit the working video frames to the storage device. The second set of cameras includes a field view camera and at least one area camera.

In an exemplary embodiment, the plurality of input frames comprises the reference video frames and the working video frames.

In an exemplary embodiment, the loading comprises loading a trained PPE model in the plurality of inference engines on the GPU. Further, the loading comprises asynchronously transferring each frame of the plurality of input frames from the host memory to the GPU memory. The loading also comprises pre-processing the plurality of input frames and enqueueing the plurality of pre-processed input frames to the input queue.

In an exemplary embodiment, the processing comprises dequeuing the plurality of pre-processed input frames from the input queue. The processing further comprises running the trained model with each frame of the plurality of pre-processed input frames on the GPU to generate the plurality of processed frames with the plurality of bounding boxes. The annotation includes a bounding box, a score, and a PPE class. Furthermore, the processing comprises enqueueing the plurality of processed frames with the plurality of bounding boxes to the output queue.

In an exemplary embodiment, the generating further comprises transferring the plurality of processed frames with the annotation to the web-based dashboard to generate the PPE compliance information. In addition, the generating comprises presenting the PPE compliance information on the display device.

In an exemplary embodiment, the program instruction is configured to concurrently perform the loading, processing, and generating.

In an exemplary embodiment, the first and second video frames are selected from the group consisting of a pre-recorded video, a real-time video from the plurality cameras, and a combination thereof.

In an exemplary embodiment, the trained model is selected from the group consisting of a PPE-CenterNet, a PPE-DAB-Deformable-DETR, and a PPE-YOLO.

In an exemplary embodiment, the trained model is the PPE-YOLO.

In an exemplary embodiment, the PPE class comprises Helmet, NoHelmet, Vest, and NoVest. The trained model is trained by a database with a first ratio of the Helmet to the NoHelmet and a second ratio of the NoVest to the Vest less than three (3) to alleviate a high-imbalanced class issue.

In an exemplary embodiment, the system processes the plurality of input frames with a rate of at least 15 frames per second (FPS).

In an exemplary embodiment, the system processes the plurality of input frames with a rate of at least 28 frames per second (FPS).

In an exemplary embodiment, the present disclosure discloses a method for real-time personal protective equipment (PPE) compliance monitoring. The method comprises creating a plurality of inference engines each comprising an engine path, a plurality of input threads, a plurality of inference threads, and a plurality of output threads. Further, the method comprises loading a plurality of input frames from the storage device to the plurality of inference engines to pre-process and enqueue the plurality of input frames to an input queue by the plurality of input threads. The method also comprises processing a plurality of pre-processed input frames from the input queue to obtain an annotation and to enqueue a plurality of processed frames with the annotation to an output queue by the plurality of inference threads. In addition, the method comprises generating an output file comprising the plurality of processed frames and the annotation by the plurality of output threads and destroying the plurality of input threads, the plurality of inference threads, and the plurality of output threads.

In an exemplary embodiment, the loading comprises loading a trained PPE model in the plurality of inference engines on the GPU. Further, the loading comprises asynchronously transferring each frame of the plurality of input frames from the host memory to the GPU memory. The loading also comprises pre-processing the plurality of input frames and enqueueing the plurality of pre-processed input frames to the input queue.

In an exemplary embodiment, the processing comprises dequeuing the plurality of pre-processed input frames from the input queue. The processing further comprises running the trained model with each frame of the plurality of pre-processed input frames on the GPU to generate the plurality of processed frames with the plurality of bounding boxes. The annotation includes a bounding box, a score, and a PPE class. Furthermore, the processing comprises enqueueing the plurality of processed frames with the plurality of bounding boxes to the output queue.

In an exemplary embodiment, the generating further comprises transferring the plurality of processed frames with the annotation to the web-based dashboard to generate the PPE compliance information. In addition, the generating comprises presenting the PPE compliance information on the display device.

In an exemplary embodiment, the trained model is the PPE-YOLO.

In an exemplary embodiment, the PPE class comprises Helmet, NoHelmet, Vest, and No Vest. The trained model is trained by a database with a first ratio of the Helmet to the NoHelmet and a second ratio of the NoVest to the Vest less than three (3) to alleviate a high-imbalanced class issue.

In an exemplary embodiment, the plurality of input frames is processed with a rate of at least 28 frames per second (FPS).

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10 depicts a Monitoring Setting Tab, according to an embodiment of the present disclosure;

FIG. 11 displays an Alert Management Tab, according to an embodiment of the present disclosure;

DETAILED DESCRIPTION

Figure 1:
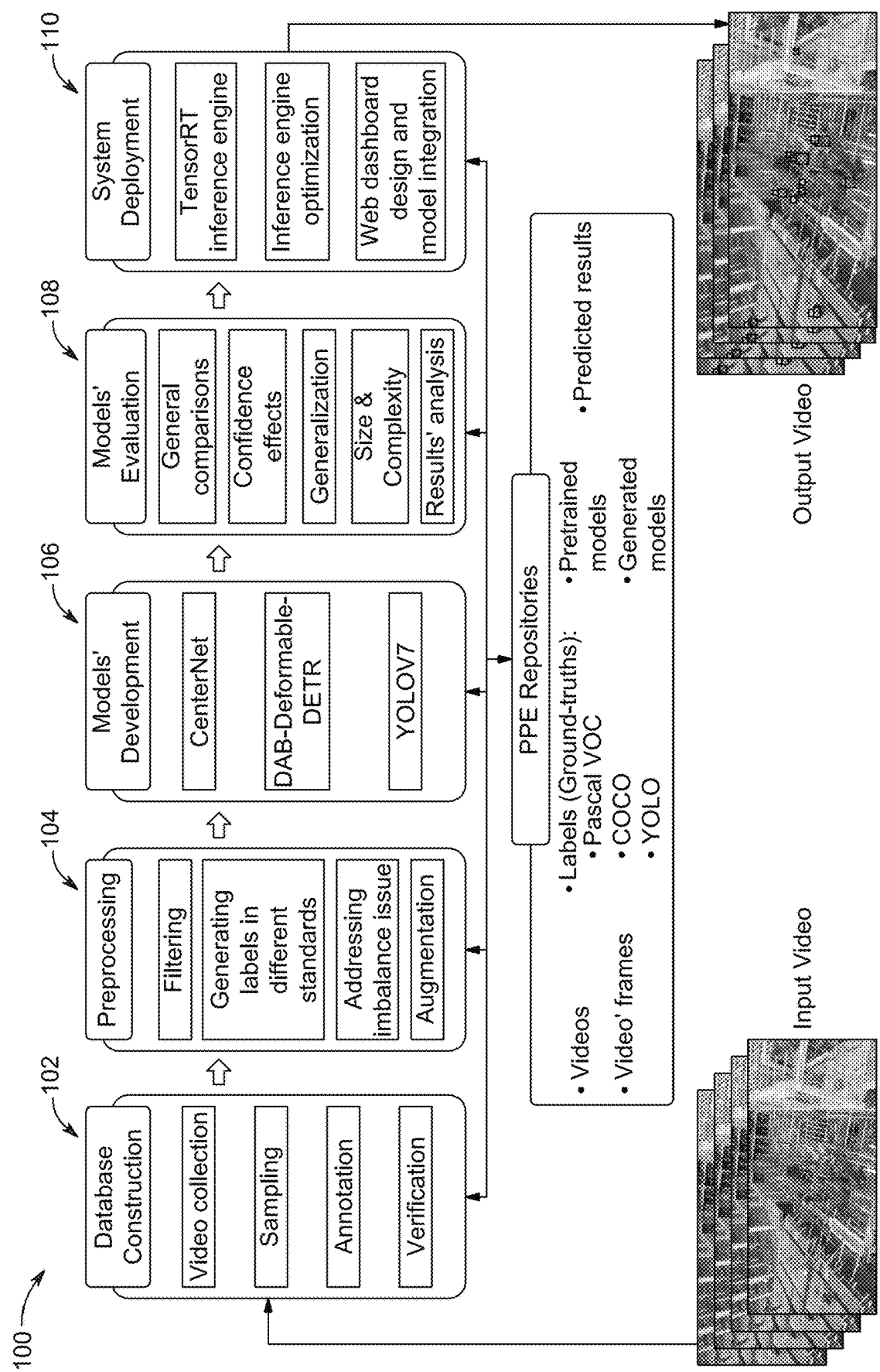
FIG. 1 depicts a schematic of a high-level architecture of the framework of the present disclosure, according to an embodiment of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

PPE compliance is typically monitored through manual inspections. This method is costly and difficult in most industrial and construction sites due to the large extension and complex structure of such areas; therefore, it is unfeasible and inconvenient for human operators to monitor workers who are not wearing PPE properly. Generally, PPE detection techniques are classified as sensor-based or vision-based. Sensor-based approaches depend on sensors for tracking and monitoring workers; these sensors are attached to the worker, PPE, or both. The Global Position System (GPS) may be used to track workers using their helmets. A PPE checking gate equipped with radio-frequency identification (RFID) technology has been studied. The gate monitors PPE compliance when workers wearing an RFID pass through the gate. Later, RFID was combined with the Internet of Things (IoT) to store the monitored PPE information on the cloud to be used by mobile applications and web-based systems. The sensor-based approaches have the advantage of reducing the need for computer vision techniques to detect and segment workers and PPEs. However, attaching sensors to PPEs is costly. In addition, wearing PPEs with sensors is cumbersome for real-time applications, and it is challenging to ensure that workers wear these PPEs.

Computer vision-based approaches are more applicable for PPE detection. Computer vision is a field of artificial intelligence that trains computers to interpret and understand the visual world. The computer vision based approaches utilize video cameras and do not require any special sensors, making them appropriate for real-time PPE monitoring applications. These cameras provide a raw video stream of the construction site that requires further preprocessing to be used by the following detection and classification stages of the monitoring system. Furthermore, vision-based methods must deal with several challenges associated with raw videos, such as occlusion, low-resolution images, and changes in illumination.

PPE vision-based methods are classified into classic and machine-learning techniques based on feature extraction techniques. The classic approaches employ computer vision techniques to extract statistical and geometric features to detect and classify PPE objects in images. A simple technique for detecting a worker's face and helmet using colors and several approaches used an edge detection algorithm to detect the worker's head and helmet has been developed. The vision-based methods also used a histogram of oriented gradient (HOG) algorithm for extracting features from worker's head; these features were fed into support vector machines (SVM) to classify the worker as wearing a helmet or not. The HOG was used with SVM to locate the worker in the image and the Circle Hough Transform (CHT) for helmet detection. Scale-invariant features transform (SIFT) was also employed for PPE detection, exhibiting better performance than other classic techniques.

The major Improvement in PPE monitoring can be attributed to the advancement of deep learning. Several deep-learning models have been developed for PPE detection. For example, a CNN model was employed for recognizing five PPEs in a constrained environment. A Single Shot MultiBox Detector (SSD) also has been used to detect whether a worker is wearing a helmet or not.

In another study, two region-based CNN (R-CNN) models for PPE monitoring was implemented. The first R-CNN was used to detect workers, and the second R-CNN was used for helmet and vest detection. In yet another study, the Faster R-CNN model for worker detection and a CNN model was employed to classify them as wearing helmets or not. In a different study, a pose-guided anchoring framework for helmet and vest detection was used. The pose estimator detects the worker skeleton to be used for extracting the body part attention regions that are candidate regions of the PPE object. These regions were fed into the CNN model to learn and classify them as helmets or vests. It was then evaluated on a dataset of images, and an average F1-score of 96.0% was reported. Pose information combined with an object detection algorithm was also used for detecting helmet and safety harness hooks. A match was performed between the spatial information of the detected PPE objects and the facial features of the worker to verify if the helmet or hooks are properly worn by the worker. This approach was evaluated on a dataset of 3,208 images, and an accuracy of 94.67% was reported.

Similarly, YOLOv3 and the OpenPose estimator were used for identifying the proper use of PPE in a video. This approach targeted four PPE classes: helmet, mask, safety glasses, and safety belt. The method was evaluated using a dataset of 6,000 images, and precision and recall of 94.47% and 83.20%, respectively, were reported. In a study, three models for verifying the PPE compliance of workers was developed. A decision tree algorithm was employed in the first approach to detect the workers and PPEs. The other approaches utilized YOLO and pre-trained CNN models for object detection and classification. An in-house dataset of 1,500 images with two PPEs: helmet, and vest, was used to evaluate the performance. According to the reported results, the YOLO model achieved the highest mean average precision (mAP) with 72.3%. YOLO was also used for detecting helmet and vest compliance. Eight detectors based on YOLO have been explored and evaluated on the Color Helmet and Vest (CHV) dataset. YOLO v5x outperformed other models with an mAP of 86.55%. However, with blurred faces, the model's performance in detecting helmets decreased by 7%. The performance of YOLO, faster R-CNN, and SSD for detecting helmets was reported to achieve the highest mAP with 53.8%, compared with 36.3% and 40.0% for SSD and R-CNN, respectively.

However, the application of computer vision and machine learning to PPE compliance monitoring presents several challenges. One of the main challenges associated with PPE compliance violation detection is the lack of annotated datasets. Few datasets have been developed for PPE detection; most of the available datasets are either collected from web images or target only one PPE, such as a helmet or dust mask. The web-based images are usually collected from a webcam or a camera close to the workers, which is not the case in most working environments where cameras are far from workers. For example, the GDUT-HWD dataset consists of 3,174 images collected from the Internet. For another example, a multi-class dataset consisting of 6,029 images of hats, dust masks, safety glasses, and safety belt images was developed; the images were collected from the web and a SONY camera installed at six different sites.

Other challenges include the variability in the appearance and positioning of PPE on different workers, the diversity of work environments and lighting conditions, and the computational demands of processing video data in real time. Despite these challenges, the potential benefits of automated, real-time PPE compliance monitoring are substantial. These include improved worker safety, increased compliance with safety regulations, and enhanced operational efficiency. Therefore, there is a continuing interest in the development of advanced systems and methods for real-time PPE compliance monitoring.

The present disclosure relates to a system and method for real-time monitoring of personal protective equipment (PPE) compliance at a worksite. The present disclosure presents a systematic framework, starting from data collection and ending with system deployment, for developing a system for PPE compliance monitoring in video streams using three state-of-the-art models. As per the present disclosure, a dataset for PPE collected from closed-circuit television (CCTV) cameras is constructed. The dataset is annotated to cover helmets, reflective tapes, and vests. Thereafter, three models for PPE detection depending on CenterNet, Vision Transformer, and YOLOv7 for PPE detection and classification are disclosed. The present disclosure also presents a multi-threaded inference engine that is capable of processing frames at a rate such as 30 frames per second (FPS) using input frames from multiple sources with the asynchronous transfer of frames from host memory to graphical processing unit (GPU) memory that hides GPU memory latency.

The system and method of the present disclosure may provide several advantages. For instance, the present disclosure may enable real-time monitoring of PPE compliance at a worksite, thereby enhancing worker safety. The present disclosure may also alleviate the high-imbalanced class issue by training the model with a specific ratio of PPE classes. Furthermore, the present disclosure may provide a robust and accurate solution for PPE compliance monitoring, leveraging state-of-the-art deep learning techniques and real-world video data. In some aspects, the system for real-time personal protective equipment (PPE) compliance monitoring at a worksite may include several components configured to work together to monitor PPE compliance. In some cases, the system may be configured to process the plurality of input frames at a rate of at least 15 frames per second (FPS), referred to herein as Element A. This may allow for real-time monitoring of PPE compliance, providing timely feedback and alerts. In other cases, the system may be configured to process the plurality of input frames at a rate of at least 28 FPS or even at a rate of at least 30 FPS, providing even faster real-time monitoring capabilities. These variations in the frame processing rate may allow for flexibility in the system's performance, accommodating different worksite conditions and requirements.

FIG. 1 depicts a schematic of a high-level architecture of the framework 100 of an embodiment of the present disclosure. The framework 100 includes a database construction stage 102 that defines the process of database collection and preparation. The database construction stage 102 includes several tasks such as data collection, sampling, annotation, and verification of video data to create a comprehensive dataset for model training.

The framework 100 includes a next stage as Preprocessing 104. The preprocessing stage 104 includes filtering the data, addressing class imbalance issues, generating standardized labels, and augmenting the data to enhance the robustness of the models. The preprocessing stage 104 consists of several tasks involving the preparation of data for the forthcoming detection tasks. It includes filtering, addressing imbalance issues, and augmentation. The Preprocessing stage 104 also includes the operations required for preparing the dataset for other tasks, such as model evaluation and deployment. Each of the evaluated object detection methods uses different annotation standards. CenterNet is based on the Pascal VOC annotation standard, while Vision transformer uses the COCO annotation format, and YOLOv7 is based on the YOLO format. The preprocessing stage 104 also generates the required annotation format for each technique and includes the preparation of the implementation environments.

Following the preprocessing stage 104, the framework 100 includes a models' development stage 106. In this stage, three distinct deep learning models are created. Several models have been disclosed in this study for PPE detection and classification. These models depend on three state-of-the-art computer vision models: CenterNet, Vision Transformer, and YOLOv7.

The framework 100 further includes Models' Evaluation stage 108 that involves assessing the performance of the developed models against various criteria, such as confidence thresholds, model size and complexity, generalization ability, and analysis of results to determine the models' effectiveness in real-world scenarios. For example, the models of the present disclosure are trained and evaluated using the constructed dataset. Two test datasets (Test Set I, and Test Set II) are used to evaluate the models. Each set contains data collected from different CCTV cameras. Different evaluation metrics have been used to report the results of each model. These metrics are True Positive (TP), False Positive (FP), Precision, Recall, F1-score, Average Precision (AP), and mAP. The PASCAL VOC 2012 evaluation tool, adapted from MATLAB to Python is employed in this module. This tool receives the detected objects and the ground truth and reports the AP, TP, FP of each class, and mAP. The tool may be extended to report the Precision, Recall, and F1-score metrics. In addition, the complexity of the models of the present disclosure is evaluated in terms of the number of parameters.

Finally, the framework 100 includes a System Deployment stage 110 where the chosen model is integrated into a web-based dashboard for operational use. This includes configuring the inference engine and employing a TensorRT inference engine to process the input video frames, generating output with predicted PPE compliance annotations. The system deployment stage 110 defines a framework for a real-time inference engine that processes video frames from both recorded video files and camera streams. The engine is multi-threaded and it is designed to achieve a performance of 30 frames per second (FPS) using a trained TensorRT model to detect PPE. The TensorRT model is configured with Non-Maximum Suppression (NMS) parameters, which help to eliminate false detections. The output frames and statistics are displayed on a web-based dashboard, where they can be viewed in real-time.

Figure 2:
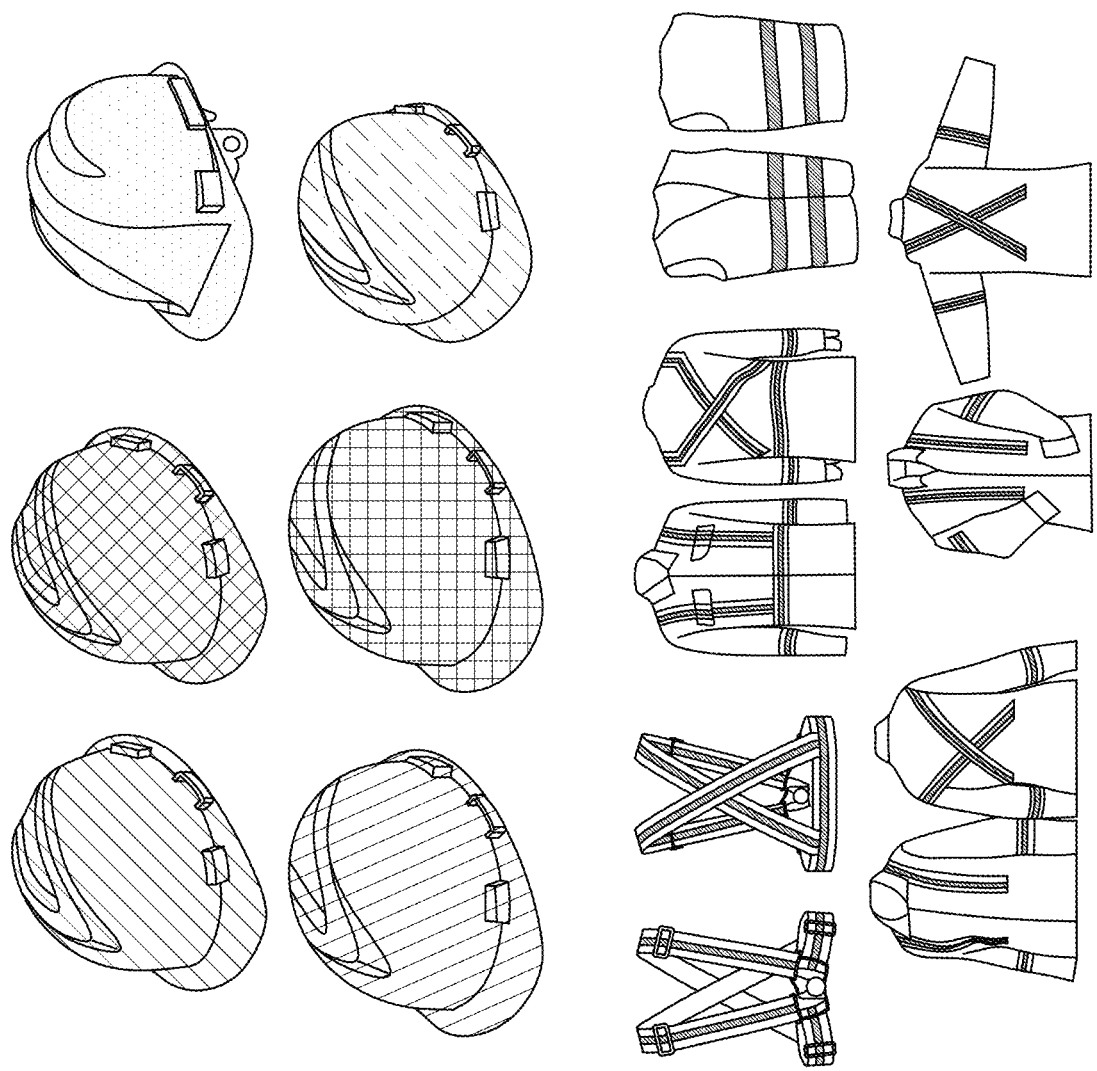
FIG. 2 illustrates various personal protective equipment (PPE) items considered during data annotation, according to an embodiment of the present disclosure.

FIG. 2 illustrates various personal protective equipment (PPE) items 200 considered during data annotation, according to an embodiment of the present disclosure. FIG. 2 displays different types of PPE such as helmets, vests, and other safety gear. These images are used to annotate and label the dataset, which is then utilized to train the PPE compliance monitoring system to recognize and classify PPE in video frames. In an example, the main objective of the present disclosure is to annotate as many PPEs appearing in the collected dataset as possible. However, it is difficult to recognize some small PPEs, such as gloves and safety shoes, due to the characteristics of the recorded videos and the distance between the CCTV cameras and workers. Therefore, the PPEs that are considered and annotated are Helmet (hard hat), NoHelmet, Vest, and NoVest. An object in the video frame is annotated as a Helmet if it is worn by a worker and the helmet fully or partially appears. This class covers all helmet colors, including blue, green, red, etc. On the other hand, an object is annotated as a NoHelmet if a worker is not wearing a helmet. If a worker is wearing a vest or reflective tape, the upper part of his body is annotated as Vest; otherwise, it is annotated as NoVest. FIG. 2 depicts the PPEs 200 considered as helmets with different colors and a vest (or reflective tape) from the front and back.

In an example, DarkLabel V2.4, a video labeling tool, was used for annotating PPEs in the collected videos. The PASCAL VOC annotation schema was followed in the annotation process. The framework 100 also generated COCO and YOLO ground truth encodings from PASCAL VOC encoding. A guideline for annotation is first prepared, and nine annotators are involved in the annotation task. The annotations are verified carefully to ensure that the PPEs of all workers shown in the video frame are annotated, the right labels are assigned for each PPE, and the right bounding boxes are drawn around objects.

Figure 3:
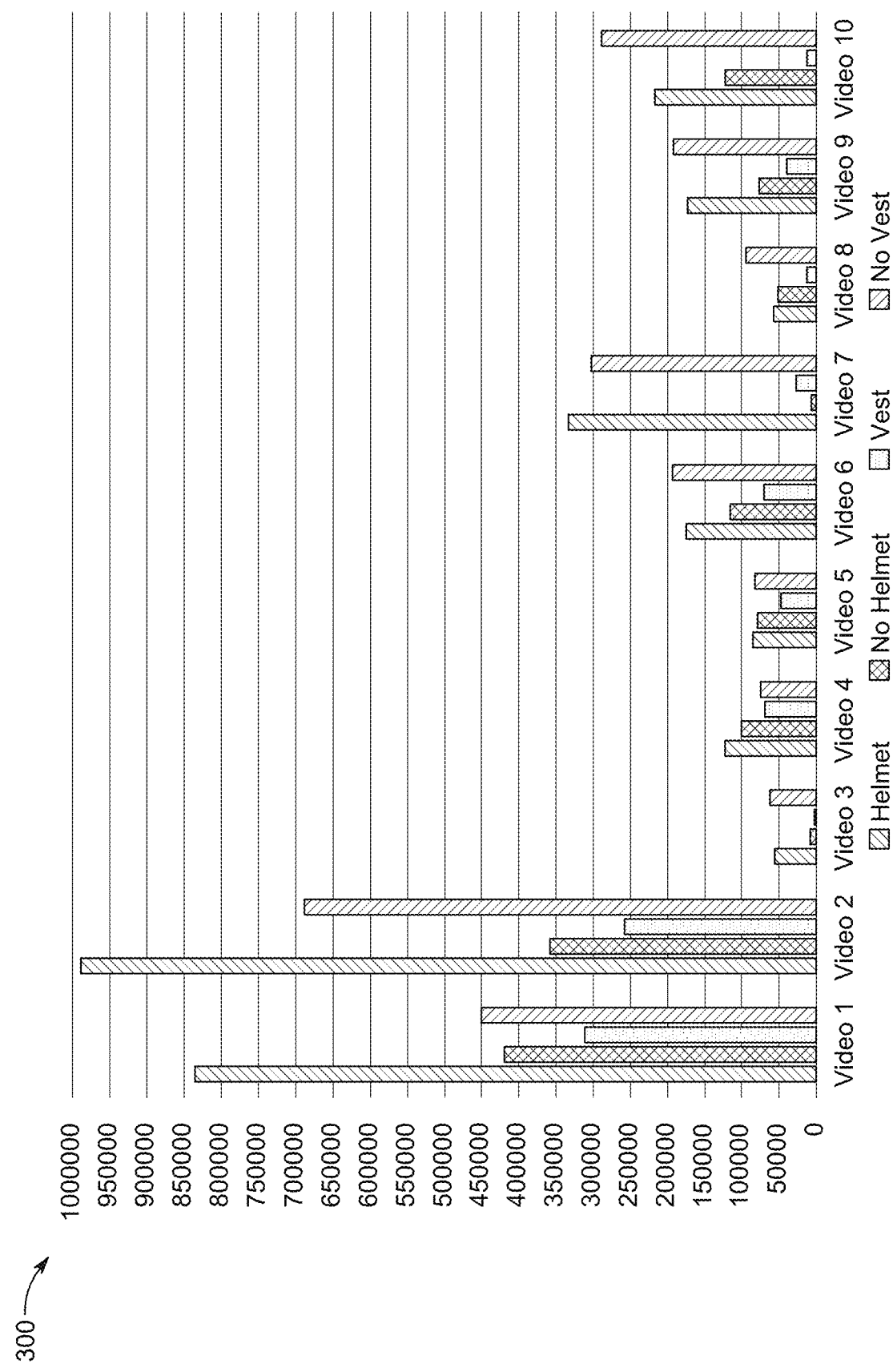
FIG. 3 presents dataset statistics, according to an embodiment of the present disclosure.

FIG. 3 presents dataset statistics 300, according to an embodiment of the present disclosure. FIG. 3 may include a graphical representation of the number of images, the distribution of PPE classes, and the variety of scenarios included in the dataset. The statistics provide insights into the diversity and balance of the dataset, which is instrumental in training robust machine learning models for PPE detection.

Ten long videos have been collected from real-world environments using CCTV cameras. Most of these videos are 30 minutes in duration. Videos have been captured from different work areas, depths, and angles at different day times of day to have more variability in the captured data. The collected videos have been recorded at 30 FPS with a resolution of 1920×1080. The videos are converted into frames using the DarkLabel tool. The frames without workers are eliminated. FIG. 3 and Table 1 (below) present the statistics of the dataset.

TABLE 1

Statistics of the constructed database in terms of the number of labels per class, per video, the total number of labels, and the number of frames per video.

|  | Video1 | Video2 | Video3 | Video4 | Video5 |
|---|---|---|---|---|---|
| Helmet | 834989 | 987669 | 57073 | 123952 | 86470 |
| No Helmet | 420343 | 358958 | 9130 | 101333 | 79363 |
| Vest | 311900 | 259502 | 2773 | 69208 | 47486 |
| NoVest | 450349 | 687963 | 63186 | 75979 | 82399 |
| All labels | 2017581 | 2294092 | 132162 | 370472 | 295718 |
| # of frames | 26003 | 45550 | 41538 | 48326 | 49971 |

|  | Video 6 | Video 7 | Video8 | Video 9 | Video10 | Total |
|---|---|---|---|---|---|---|
| Helmet | 175593 | 333744 | 57726 | 174186 | 218252 | 3049654 |
| No Helmet | 116970 | 7678 | 52785 | 78112 | 121686 | 1346358 |
| Vest | 70150 | 27408 | 13500 | 40052 | 13542 | 855521 |
| NoVest | 193940 | 303081 | 94607 | 191471 | 288582 | 2431557 |
| All labels | 556653 | 671911 | 218618 | 483821 | 642062 | 7683090 |
| # of frames | 53637 | 58094 | 24001 | 27890 | 11001 | 386011 |

Several datasets have been disclosed in the literature for PPE detection. These datasets have aided in stimulating advancements in assuring site safety. A comparison between these datasets and the dataset of the present disclosure is shown in Table 2.

TABLE 2

Comparison between the dataset of the present disclosure and other PPE datasets.

| Datasets | Size (images) | PPE | Num of classes: Labels | Wide Angle |
|---|---|---|---|---|
| GDUT- | 3174 | Helmet | 5: Yellow helmet, White | No |

TABLE 2-continued

Comparison between the dataset of the present disclosure and other PPE datasets.

| Datasets | Size (images) | PPE | Num of classes: Labels | Wide Angle |
|---|---|---|---|---|
| HWD | | | helmet, Red helmet, Blue helmet, and No helmet | |
| Pictor-v3 | 1500 | Helmet, and Vest | 3: Worker, helmet, and vest | No |
| CHV | 1330 | Helmet and Vest | 6: Worker, vest, Yellow helmet, White helmet, Red helmet, and Blue helmet | No |
| SHWD | 7581 | Helmet | 2: Helmet, and No helmet | No |
| CPPE | 932 | Helmet and Vest | 3: Helmet, Vest, and workers | No |
| CPPE-5 | 1029 | Coverall, Face Shield, Gloves, Goggles, and Mask | 5: Coverall, Face Shield, Gloves, Goggles, and Mask | No |
| Present Disclosure | 386011 | Helmet, Vest, and Reflective tape | 4: Helmet, No helmet, Vest, and No vest. | Yes |

The comparison involves the dataset size, the number of classes, and the data source. As shown in the table, 2 all other datasets are limited in size. The largest dataset is the safety helmet wearing detect dataset (SHWD) with 7581 images. However, this dataset contains samples for helmets only as does the GDU Hardhat Wearing Detection (GDUT-HWD) dataset. Although Pictor-v3 targets helmets and vests, it has few vest samples. The dataset that contains several PPE types is CPPE-5 dataset with 6 PPEs; however, this dataset targets PPEs in the medical field which makes it inappropriate for training models for monitoring PPE compliance in a non-medical environments, such as construction and industry.

In contrast, the dataset of the present disclosure outperformed other datasets in terms of size, with more than 386,000 images. Furthermore, almost all the samples in the dataset of the present disclosure contain more than one worker with different PPE compliance. Moreover, all the available datasets have a close-view image whereas the dataset of the present disclosure was collected from CCTV cameras with a wide angle using four classes helmet, no helmet, vest, and no vest.

The dataset used for the models' development and evaluation is processed through three developed models for PPE detection. The models include CenterNet, DEtection TRansformer (DETR), and You-only-look-once (YOLO).

Example 1

CenterNet is an anchor-free fast object detection model that utilizes the Object as point technique for object detection. CenterNet represents an object using the geometric center of the object which is called a keypoint heatmap. The center is then used to predict the other properties of the object such as the coordinates of the bounding box, dimension, 3D extent, orientation, and pose. CenterNet is a fully CNN network that receives an input image $I \in R^{W \times H \times 3}$ and generates a keypoint heatmap, $$\hat{Y} \in [0, 1]^{\frac{W}{A} \times \frac{H}{A} \times C}$$

where R is the output and C is the number of keypoint types. In the present disclosure, R=4 is the default stride and C=4 equals the PPEs types (Helmet, NoHelmet, Vest, and NoVest) such that a prediction $\hat{Y}_{x,y,c}=0$ is background while $\hat{Y}_{x,y,c}=1$ is a detected keypoint in order to predict an object k with bounding box $x_{min}^k, y_{min}^k, x_{max}^k, y_{max}^k$ belonging to the considered PPEs (Helmet, NoHelmet, Vest, and NoVest).

The center $p_k$ is calculated using Eq. 1

$$p_k = \left( \frac{x_{min}^k + x_{max}^k}{2}, \frac{y_{min}^k + y_{max}^k}{2} \right) \quad (1)$$

The keypoint estimator $\hat{Y}$ is used to predict all center points and the size of each detected object is regressed using Eq. 2 with considering a single size prediction $$\hat{S} \in R^{\frac{W}{A} \times \frac{H}{A} \times 2}$$

for all classes.

$$s_k = (x_{max}^k - x_{min}^k, y_{max}^k - y_{min}^k) \quad (2)$$

For each center point, a local offset $$\hat{O} \in R^{\frac{W}{A} \times \frac{H}{A} \times 2}$$

is predicted to recover the discretization error caused by the output stride. The overall training objective is to predict key points $\hat{Y}$, offset $\hat{O}$, and size $\hat{S}$ using one single network.

$$L_{det} = L_k + \lambda_{size} L_{size} + \lambda_{off} L_{off}$$

where $L_k$ is a penalty-reduced pixel-wise logistic regression with focal loss using:

$$L_k = -\frac{1}{N} \sum \begin{cases} (1 - \hat{Y}_{xyc})^\alpha \log(\hat{Y}_{xyc}) & \text{if } Y_{xyc} = 1 \\ (1 - Y_{xyc})^\beta (\hat{Y}_{xyc})^\alpha \\ \log(1 - \hat{Y}_{xyc}) & \text{otherwise} \end{cases} \quad (4)$$

$L_{size}$ is the size which is trained using $L_1$ loss, as follows:

$$L_{size} = \frac{1}{N} \sum_{k=1}^{N} |\hat{S}_{pk} - s_k| \quad (5)$$

$L_{off}$ is the offset and, like $L_{size}$, it is also trained using $L_1$ loss using Eq. 6:

$$L_{off} = \frac{1}{N}\sum_{p}\left|\hat{O}_{\tilde{p}} - \left(\frac{p}{R} - \tilde{p}\right)\right| \qquad (6)$$

Example 2

DEtection TRansformer (DETR) is the first end-to-end approach developed for object detection using the Transformer model. DETR utilizes a set of fixed, small, and learnable object queries to find the relations between the objects and the global image context via bipartite matching, an encoder-decoder architecture, and a global loss leading to parallelly predicting the final set of the objects. DETR removes the need for many hand-designed components, compared to convolutional neural architectures, such as eliminating the post-processing step of NMS. However, DETR still suffers from slow convergence and does not perform well in the detection of small objects. Consequently, many attempts have been conducted to solve the main issues of DETR. The PPE-based transformer of the present disclosure is based on Dynamic Anchor Box and deformable attention DEtection TRansformer (DAB-deformable-DETR). DAB-deformable-DETR is based on deformable cross-attention and dynamically updated 4D anchor boxes. The deformable attention module attends to a small set of key sampling points around a reference point by assigning only a fixed number of keys for each query regardless of the spatial size of the feature map as Deformable DETR. Deformable DETR is inspired by deformable convolution. In contrast to the previous studies which rely solely on 2D static queries, DAB-deformable-DETR utilizes dynamic queries as 4D anchor box coordinates (x, y, w, h). The point (x, y) refers to the query center position to pool features around the center, and (w, h) refers to the anchor box size to modulate the cross-attention map. The queries are updated dynamically layer by layer. Introducing queries considering both size and position can enrich the cross-attention module.

The high-level structure of the PPE-Transformer of the present disclosure is composed of a backbone, transformer encoder, transformer decoder, and prediction heads. The backbone module receives a video frame (image) $x_{img} \in R^{3 \times H_0 \times W_0}$ as an input and extracts the spatial features, a lower-resolution activation map $f \in R^{C \times H \times W}$, where the typical values are C=2048. The extracted features are then fed into the Transformer encoder for refinement. The encoder module comprises normalization layers, skip connections, a multi-head self-attention module, and a feed-forward network (FFN). It first generates a new feature map $z_0 \in R^{d \times H \times W}$ such that d<C using 1×1 convolution filter. It then transforms $z_0$ into a token of one dimension d×HW by adding spatial position embedding to queries and keys at each attention layer. The generated embeddings are fed into the transformer decoder, in which the object queries (positional encodings) are learned and added to each attention layer. The transformer decoder transforms the N object queries into the corresponding embeddings. The embeddings are fed into the FFN to be decoded independently into box coordinates and detecting PPE labels.

Example 3

You-only-look-once (YOLO) is an object detection model that can detect objects in images and videos. It works by dividing an input image into a grid and using the grid to determine which objects appear within each section of the grid. It also uses a neural network to classify objects. YOLO is fast and accurate, making it ideal for real-time applications. It is also robust, as it can handle changes in the environment, such as moving objects. The main framework of YOLOv7 comprises three main components: Backbone, Neck, and Head. The Backbone is a CNN-based architecture that receives an input image and extracts the features at different granularities. The extended efficient layer aggregation Network (E-ELAN), as an extended version of the efficient layer aggregation network (ELAN) was developed to be the Backbone architecture of YOLOv7, which is composed of several operations including expand, shuffle, and merge. The extracted features are then fed into the Neck component, which is the intermediate layer between the Backbone and the Head. The neck is based on the featured pyramid network (FPN), which combines ConvNet layer representations and generates the feature pyramid. The generated features are then fed into the Head layer to predict the bounding boxes and the classes, trained using three loss functions: cross-entropy loss, for class prediction, L1 loss for bounding box prediction, and objectness loss for object existence detection. In contrast to vision transformer-based object detection technique, YOLOv7 relies on the NMS technique as a postprocessing step to eliminate more than one candidate object proposals for classification.

Example 4

The dataset of the present disclosure is divided into training, validation, and testing sets. The test set contains videos captured in an environment different than the training set. Two sets have been used for evaluating the models of the present disclosure, Test set I and Test set II which contain frames extracted from Video 2 and Video 7, respectively. The remaining videos are used for model training and validation. To alleviate the high-imbalanced class issue in the training set, all frames within the four considered classes (NoHelmet, Helmet, NoVest, and Vest) are included for the training phase such that the ratio of Helmet to NoHelmet and the ratio of NoVest to Vest is <=3. The first 90% of the extracted frames from each video are selected for training, and the last 10% are used for validation. Table 3 (provided below) presents the statistics of the dataset used for the models' development and evaluation.

TABLE 3

Statistics of the dataset used for the models' development and evaluation.

|  | # of frames | # of objects | NoHelmet | Helmet | No Vest | Vest |
| --- | --- | --- | --- | --- | --- | --- |
| Training | 95100 | 2634324 | 584859 | 954069 | 726220 | 369176 |
| Validation | 10580 | 363842 | 87107 | 132965 | 102107 | 41663 |
| Test Set I | 45550 | 2294092 | 358958 | 987669 | 687963 | 259502 |

TABLE 3-continued

Statistics of the dataset used for the models' development and evaluation.

|  | # of frames | # of objects | NoHelmet | Helmet | No Vest | Vest |
|---|---|---|---|---|---|---|
| Test Set II | 58094 | 671911 | 7678 | 333744 | 303081 | 27408 |
| All Test Sets | 103644 | 2966003 | 366635 | 1321412 | 991042 | 286914 |
| Total | 209324 | 5964169 | 1038601 | 2408446 | 1819369 | 697753 |

The models of the present disclosure were trained using the default parameters as the best parameters, performing some modifications based on the results obtained on our validation sets. For the PPE-CenterNet, the model was trained on an input image of 1024×1024, applying image cropping, brightness, and random scaling as data augmentation. The present disclosure uses a 5e-4 learning rate for 100 epochs with a learning rate dropped 10× at 50 and 90 epochs and a batch size of 16, ReLU activation function, and ADAM optimizer. For the PPE-Transformer, the model was trained on input frames of 1920×1080. Noise light, brightness, contrast, and horizontal flip were used as data augmentation. We used 1e-4 learning rate for 100 epochs with a learning rate dropped 10× at 40 and 80 epochs, ReLU activation function, and ADAM optimizer. The model was trained using eight attention heads, 300 query slots, six encoding layers, and six decoding layers. ResNet50 was used as a feature extraction backbone. The PPE-YOLO was trained using an input image of 1920×1920, applying image cropping, brightness, random scaling, hue, horizontal flip, saturation, and translation as online augmentation. The momentum factor, learning rate, and decay rate are set to 0.937, 0.01, and 5e-4, respectively.

Figure 4:
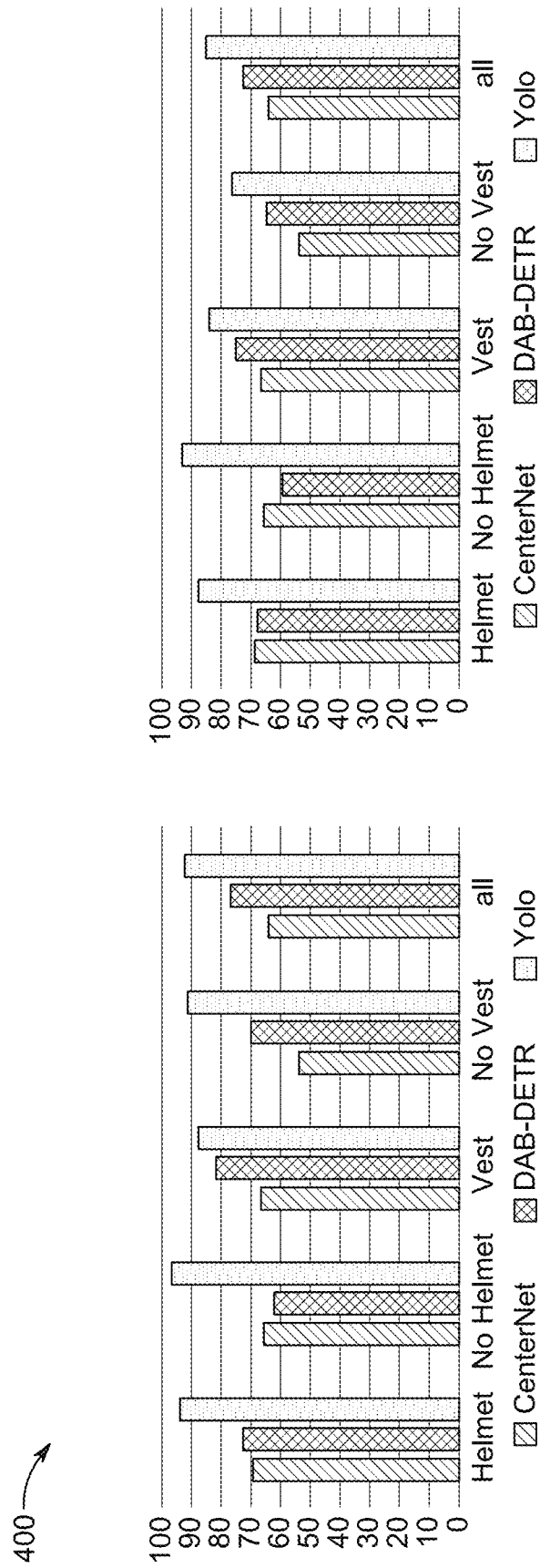
FIG. 4 depicts the average precision (AP) for each PPE class and the overall mean average precision (mAP) of Test Set I with varying confidence scores, according to an embodiment of the present disclosure.

FIG. 4 depicts a graph 400 indicating the average precision (AP) for each PPE class and the overall mean average precision (mAP) of Test Set I with varying confidence scores, according to an embodiment of the present disclosure. The figure may show a comparison of the performance of different deep learning models, such as CenterNet, DAB-Deformable-DETR, and YOLO, in detecting PPE compliance. The AP values for 'No Helmet' starting at CenterNet No Helmet AP start 100, 'Helmet' starting at CenterNet Helmet AP start 200, 'No Vest' starting at CenterNet No Vest AP start 300, 'Vest' starting at CenterNet Vest AP start 400, and the overall mAP starting at CenterNet all classes AP start 500, as well as for DAB-DETR starting at DAB-DETR No Helmet AP start 600, DAB-DETR Helmet AP start 700, DAB-DETR No Vest AP start 800, DAB-DETR Vest AP start 900, and DAB-DETR all classes AP start 1000, are plotted against different confidence thresholds to evaluate model performance.

The present disclosure considers Recall, Precision, F1, and AP evaluation metrics to evaluate the models of the present disclosure. It should be emphasized that the evaluation metrics related to object detection are slightly different from standard classification tasks. All models are evaluated using an intersection over union (IoU) of 0.5. IoU represents the overlap between the ground truth bounding box (Bg) and the predicted bounding box (Bp). It is used with two different confidence thresholds, 0.0 and 0.3. The confidence score threshold is used in object detection tasks to filter out false positives and ensure that a predicted bounding box has a specific minimum score. The first confidence threshold of 0.0 indicates that all detected objects with confidences of greater than 0.0 will be considered, whereas the second confidence threshold of 0.3 indicates that only objects detected with confidences of greater than 0.3 will be considered. The confidence threshold of 0.0 is the default threshold used for evaluating object detection models, while the confidence threshold of 0.3 is the recommended threshold for the inference phase; it is also selected based on our investigation of different confidences on the validation set.

Precision and Recall are calculated for each prediction based on a sorted list of detections to calculate the mAP. The Precision and Recall are calculated using the IoU value for a given IoU threshold. Recall, Precision, and F1 metrics are calculated using the Equations 7, 8, and 9, respectively, based on the IoU, where True Positive (TP) refers to the correct detection of ground-truth bounding boxes, False Positive (FP) refers to incorrect detection of nonexistent objects or misplaced detection of existing objects; False Negative (FN) refers to undetected ground-truth bounding boxes.

$$\text{Recall} = \frac{TP}{TP + FN} = \frac{TP}{\text{all ground truths}} \quad (7)(8)$$

$$F_1 = \frac{2 * \text{Precision} * \text{Recall}}{\text{Precision} + \text{Recall}} \quad (9)$$

The mAP is the mean of APs of all classes. The AP is calculated for each class as follows:

$$AP: \sum_{i=1}^{n} p(i)\Delta r(i) \quad (10)$$

where n is the total number of detections, i is the rank of singular detection within the list of sorted detections, p (i) is the cumulative precision from first to the ith detection, and Δr (i) denotes the variation in Recall from the (i−1)th to the ith detection.

Further, Table 4 below presents the obtained results using the PPE-CenterNet model on Test Set I and Test Set II.

TABLE 4

Results of PPE-CenterNet, GT: Ground Truth. The upper rows present the results for
Test Set I, while the bottom rows present the results for Test Set II. The left and right parts show
the results for objects detected with confidence thresholds of 0.0 and 0.3, respectively.

|  |  |  | Confidence > 0.0 | | | | | Confidence > 0.3 | | | | | |
| --- | --- | --- | --- | --- | --- | --- | --- | --- | --- | --- | --- | --- | --- |
|  |  | GT | TP | FP | Prec | Recall | F1 | AP | TP | FP | Prec | Recall | F1 | AP |
| Test Set I | NoHelmet | 358957 | 244225 | 50945 | 82.74 | 68.04 | 74.67 | 65.71 | 243820 | 27642 | 89.82 | 67.92 | 77.35 | 65.61 |
|  | Helmet | 987668 | 696161 | 46708 | 93.71 | 70.49 | 80.46 | 69.42 | 691558 | 22237 | 96.88 | 70.02 | 81.29 | 68.97 |
|  | NoVest | 687961 | 398975 | 98227 | 80.24 | 57.99 | 67.33 | 54.16 | 397082 | 60057 | 86.86 | 57.72 | 69.35 | 53.93 |
|  | Vest | 259506 | 182597 | 45138 | 80.18 | 70.36 | 74.95 | 66.83 | 181757 | 34858 | 83.91 | 70.04 | 76.35 | 66.56 |
|  | All | 2294092 | 1521958 | 241018 | 84.22 | 66.72 | 74.35 | 64.03 | 1514217 | 144794 | 89.37 | 66.43 | 76.09 | 63.77 |
| Test Set II | NoHelmet | 7678 | 164 | 167708 | 0.1 | 2.14 | 0.19 | 0.04 | 100 | 43191 | 0.23 | 1.3 | 0.39 | 0.04 |
|  | Helmet | 333744 | 171540 | 415738 | 29.21 | 51.4 | 37.25 | 41.91 | 151347 | 153160 | 49.7 | 45.35 | 47.43 | 39.5 |
|  | NoVest | 303081 | 79717 | 518179 | 13.33 | 26.3 | 17.7 | 18.22 | 69089 | 194221 | 26.24 | 22.8 | 24.4 | 17.49 |
|  | Vest | 27408 | 11898 | 281589 | 4.05 | 43.41 | 7.42 | 26.19 | 10813 | 71489 | 13.14 | 39.45 | 19.71 | 25.86 |
|  | All | 671911 | 263155 | 1215506 | 11.67 | 30.81 | 15.64 | 21.59 | 231349 | 462061 | 22.33 | 27.22 | 22.98 | 20.72 |

For Test Set I, the highest mAP of 64.03 is obtained when considering all detected objects (i.e., confidence threshold of 0.0) while the highest overall average of Precision and F1 are obtained for the detections with a confidence threshold of 0.3. There is an insignificant difference between the Recall reported for all detections (confidence threshold of 0.0), and that for objects detected with a confidence threshold of 0.3. It can be seen that the Helmet class is the most accurate detected class, followed by the Vest class with APs of 69.42% and 66.83%, respectively. However, the lowest results are obtained for the NoVest class in nearly all cases. PPE-CenterNet demonstrates poor results for Test Set II, as shown in the bottom part of Table 4, reporting mAPs of 21.59% in the best case when considering all detected objects and 20.72% when considering only the objects with a confidence threshold of 0.3. NoHelmet is the most challenging class, while Helmet is the most accurate detected class with an AP of 41.91% for objects detected with a confidence threshold of 0.0 and an AP of 20.72% when just considering the objects with a confidence threshold of 0.3. The obtained results using the DAB-Deformable-DETR model are presented in Table 5 below:

Similar to the CenterNET-based model, the DAB-Deformable-DETR achieved higher results with Test Set I compared with Test Set II. For Test Set I, the DAB-Deformable-DETR model achieves an mAP of 72.91% for all detected objects and achieves an mAP of 68.05% for objects detected with a confidence threshold of 0.3. The Helmet class is the most accurate detected class with an AP of 81.92% for all detected objects and an AP of 75.16% for objects detected with a confidence threshold of 0.3. The lowest results for Test Set I are obtained for the NoHelmet class with APs of 62.34% and 59.35% for detected objects with confidence thresholds of 0.0 and 0.3, respectively. For Test Set II, the transformer-based model achieved an mAP of 58.32% for all detections (confidence threshold of 0.0) and 53.23% for the detected objects with a confidence threshold of 0.3. The Helmet is the most accurate class with APs of 86.78% and 79.24% for detected objects with confidence thresholds of 0.0 and 0.3, respectively. In addition, the model performs well for the NoVest and the Vest classes with reporting APs of 79.69% and 63.54%, respectively for detections with a confidence threshold of 0.0. However, the model can't perfectly detect objects belonging to the NoHelmet class, reporting APs of 3.28% and 2.38% for detected objects with confidence thresholds of 0.0 and 0.3, respectively.

The results obtained using the PPE-YOLO model are presented in Table 6 for Test Set I and Test Set II.

TABLE 5

Results of vision Transformer PPE-DAB-Deformable-DETR, GT: Ground Truth. The
upper rows present the results for Test Set I, while the bottom rows present the results of Test Set
II. The left part shows the results for the detected objects with a confidence threshold of 0.0,
while the right part is for the detected objects with a confidence threshold of 0.3

|  |  |  | Confidence > 0.0 | | | | | Confidence > 0.3 | | | | | |
| --- | --- | --- | --- | --- | --- | --- | --- | --- | --- | --- | --- | --- | --- |
|  |  | GT | TP | FP | Prec | Recall | F1 | AP | TP | FP | Prec | Recall | F1 | AP |
| Tset Set I | Nohelmet | 358957 | 259949 | 767290 | 25.31 | 72.42 | 37.51 | 62.34 | 245134 | 54900 | 81.70 | 68.29 | 74.40 | 59.35 |
|  | Helmet | 987668 | 849393 | 866377 | 49.51 | 86.00 | 62.84 | 81.92 | 770306 | 47217 | 94.22 | 77.99 | 85.34 | 75.16 |
|  | NoVest | 687961 | 518170 | 516906 | 50.06 | 75.32 | 60.15 | 70.16 | 470697 | 63095 | 88.18 | 68.42 | 77.05 | 64.72 |
|  | Vest | 259506 | 213278 | 563637 | 27.45 | 82.19 | 41.16 | 77.21 | 198456 | 28233 | 87.55 | 76.47 | 81.64 | 72.97 |
|  | All | 2294092 | 1840790 | 2714210 | 38.08 | 78.98 | 50.41 | 72.91 | 1684593 | 193445 | 87.91 | 72.79 | 79.61 | 68.05 |
| Test Set II | Nohelmet | 7678 | 5580 | 1962452 | 0.28 | 72.68 | 0.56 | 3.28 | 3235 | 58706 | 5.22 | 42.13 | 9.29 | 2.38 |
|  | Helmet | 333744 | 309021 | 1447906 | 17.59 | 92.59 | 29.56 | 86.78 | 270421 | 13029 | 95.40 | 81.03 | 87.63 | 79.24 |
|  | NoVest | 303081 | 264202 | 696231 | 27.51 | 87.17 | 41.82 | 79.69 | 220716 | 29034 | 88.37 | 72.82 | 79.85 | 69.14 |
|  | Vest | 27408 | 25785 | 1098223 | 2.29 | 94.08 | 4.48 | 63.54 | 24199 | 39080 | 38.24 | 88.29 | 53.37 | 62.16 |
|  | All | 671911 | 604588 | 5204812 | 11.92 | 86.63 | 19.11 | 58.32 | 518571 | 139849 | 56.81 | 71.07 | 57.54 | 53.23 |

TABLE 6

Results of PPE-YOLO, GT: Ground Truth. The upper rows present the results for
Test Set I, while the bottom rows present the results for Test Set II. The left and right parts show
the results for the detected objects with confidence thresholds of 0.0 and 0.3, respectively

|  |  |  | Confidence score > 0.0 | | | | | Confidence score > 0.3 | | | | | |
| --- | --- | --- | --- | --- | --- | --- | --- | --- | --- | --- | --- | --- | --- |
|  |  | GT | TP | FP | Prec | Recall | F1 | AP | TP | FP | Prec | Recall | F1 | AP |
| Test Set I | NoHelmet | 358957 | 345771 | 647648 | 34.81 | 96.33 | 51.14 | 93.78 | 320890 | 17785 | 94.75 | 89.40 | 91.99 | 87.94 |
|  | Helmet | 987668 | 965792 | 466497 | 67.43 | 97.79 | 79.82 | 96.79 | 926847 | 24442 | 97.43 | 93.84 | 95.60 | 93.10 |
|  | NoVest | 687961 | 644194 | 1044031 | 38.16 | 93.64 | 54.22 | 87.70 | 545892 | 51016 | 91.45 | 79.35 | 84.97 | 84.04 |
|  | Vest | 259506 | 250075 | 450450 | 35.70 | 96.37 | 52.10 | 91.17 | 224788 | 32145 | 87.49 | 86.62 | 87.05 | 76.51 |
|  | All | 2294092 | 2205832 | 2608626 | 44.02 | 96.03 | 59.32 | 92.36 | 2018417 | 125388 | 92.78 | 87.30 | 89.91 | 85.40 |
| Test Set II | NoHelmet | 7678 | 7507 | 824543 | 0.90 | 97.77 | 0.90 | 11.34 | 2370 | 14893 | 13.73 | 30.87 | 19.00 | 4.86 |
|  | Helmet | 333744 | 328206 | 992854 | 24.84 | 98.34 | 24.84 | 96.05 | 312888 | 26478 | 92.20 | 93.75 | 92.97 | 92.61 |
|  | NoVest | 303081 | 287231 | 1193094 | 19.40 | 94.77 | 19.40 | 85.30 | 192622 | 11200 | 94.51 | 63.55 | 76.00 | 62.68 |
|  | Vest | 27408 | 26720 | 770282 | 3.35 | 97.49 | 3.35 | 74.11 | 25546 | 76852 | 24.95 | 93.21 | 39.36 | 73.53 |
|  | All | 671911 | 649664 | 3780773 | 12.13 | 97.09 | 20.04 | 66.70 | 533426 | 129423 | 56.34 | 70.34 | 56.83 | 58.42 |

For Test Set I, PPE-YOLO reports the highest overall mAPs of 92.36% in case of considering objects detected with a confidence threshold of 0.0, while achieving mAP of 85.05% when just considering the detected objects with a confidence threshold of 0.3. The Helmet is the most accurate detected class with APs of 96.79% and 93.10% for detected objects with confidences thresholds of 0.0 and 0.3, respectively. The lowest results for Test Set I are obtained for the NoVest class with an AP of 87.70% for all detected objects (confidence threshold of 0.0) and for the Vest class with an AP of 84.04% for the detected objects with a confidence threshold of 0.3. For Test Set II, PPE-YOLO also achieves the highest mAP of 66.70% for all detected objects and mAP of 58.42% for the detected objects with a confidence threshold of 0.3. The Helmet is the most accurate class with APs of 96.05% and 92.61% for detections with confidence thresholds of 0.0 and 0.3, respectively. In addition, the model performs well for the NoVest and the Vest classes with reporting APs of 85.30% and 74.11%, respectively for objects detected with a confidence threshold of 0.0. The model also can detect the Vest and the NoVest objects with APs of 73.53% and 62.61%, respectively for the detected objects with a confidence threshold of 0.3. However, the model cannot accurately detect objects belonging to the NoHelmet class, reporting APs of 11.34% and 4.86% for objects detected with confidence thresholds of 0.0 and 0.3, respectively. As shown in Tables 4, 5, and 6, PPE-YOLO obtained the highest AP for all classes and the highest overall average mAP for all cases with Test Set I, as depicted in FIG. 4.

Figure 5:
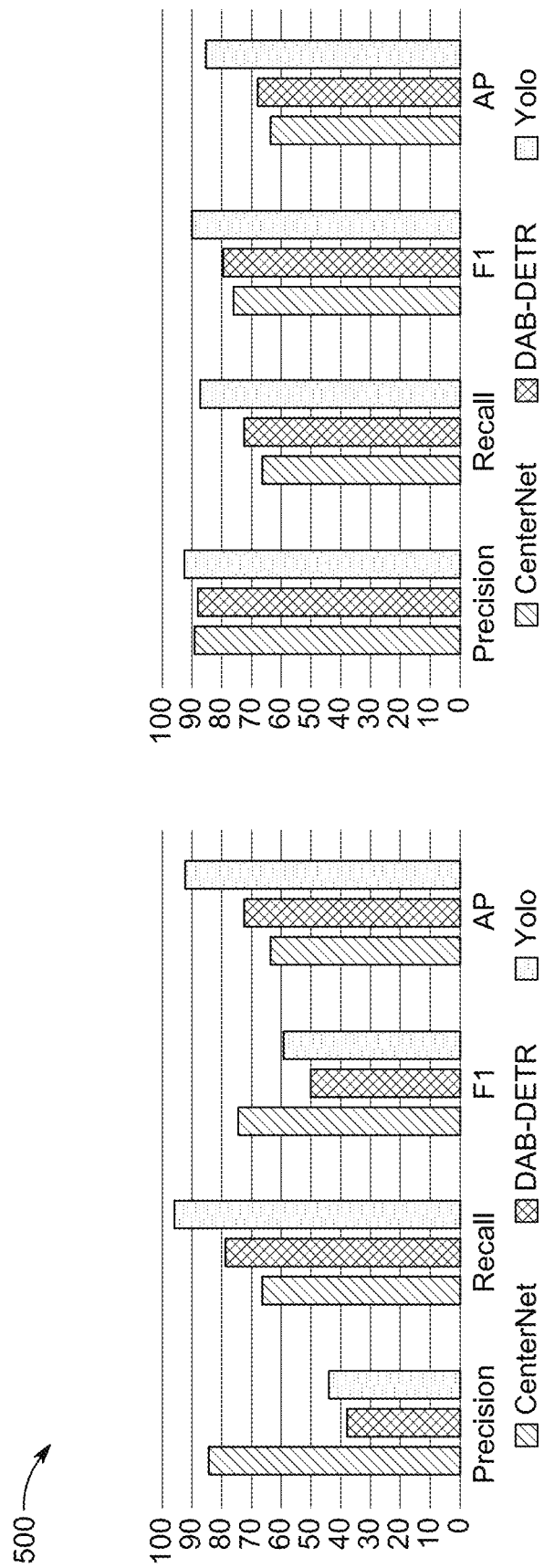
FIG. 5 depicts the overall average Precision, Recall, F1-score, and AP of Test Set I with varying confidence scores, according to an embodiment of the present disclosure.

FIG. 5 depicts a graph 500 indicating the overall average Precision, Recall, F1-score, and AP of Test Set I with varying confidence scores, according to an embodiment of the present disclosure. FIG. 5 may include bar graphs or line charts that illustrate the trade-offs between precision and recall at different confidence levels for the PPE detection models. The performance metrics for 'No Helmet' starting at CenterNet No Helmet AP start 100 and the percentage marks at eighty percent mark 80, sixty percent mark 60, forty percent mark 40, twenty percent mark 20, and zero percent mark 0 are included to provide a comprehensive evaluation of the models' capabilities. Further, The lowest mAP is reported using CenterNet. However, PPE-CenterNet achieves better AP than PPE-DAB-Deformable-DETR in the case of detecting the NoHelmet class for all the detected objects (with a confidence threshold of 0.0) and for detecting objects with a confidence threshold of 0.3. It also performs better than PPE-DAB-Deformable-DETR for the Helmet class in the case of detecting objects with a confidence threshold of 0.3. In addition, PPE-YOLO reports the highest Recall score in all cases. However, PPE-CenterNet achieves the highest Precision and F1 in the case of detecting all objects (with a confidence threshold of 0.0), as depicted in FIG. 5.

Figure 6:
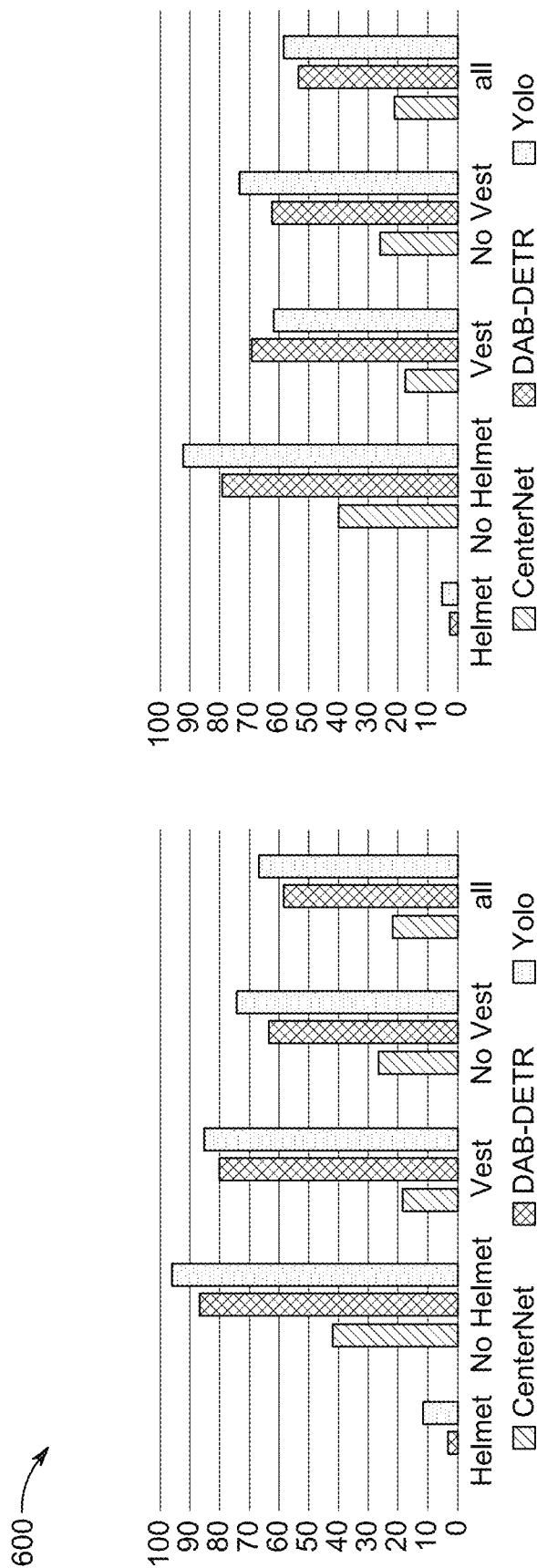
FIG. 6 presents the AP for each PPE class and the overall mAP for Test Set II with varying confidence scores, according to an embodiment of the present disclosure.

FIG. 6 illustrates a graph 600 depicting the AP for each PPE class and the overall mAP for Test Set II with varying confidence scores, according to an embodiment of the present disclosure; Similar to FIG. 4, FIG. 6 may compare the precision of PPE detection across different models for a second test set. The AP values for 'No Helmet' starting at CenterNet No Helmet AP start 100, 'Helmet' starting at CenterNet Helmet AP start 200, 'No Vest' starting at CenterNet No Vest AP start 300, 'Vest' starting at CenterNet Vest AP start 400, and the overall mAP starting at CenterNet all classes AP start 500, as well as for DAB-DETR starting at DAB-DETR No Helmet AP start 600, DAB-DETR Helmet AP start 700, DAB-DETR No Vest AP start 800, DAB-DETR Vest AP start 900, and DAB-DETR all classes AP start 1000, are plotted to assess the models' performance on a different dataset. Even though PPE-CenterNet reports the highest results, PPE-YOLO remains the best in terms of TP and FP. This is why PPE-YOLO reports the highest overall mAPs. For Test Set II, PPE-YOLO also reports the highest mAPs for all cases, as depicted in FIG. 6, except in the case of the Vest class detected with a confidence threshold of 0.3 in which, PPE-DAB-Deformable-DETR performs better.

Figure 7:
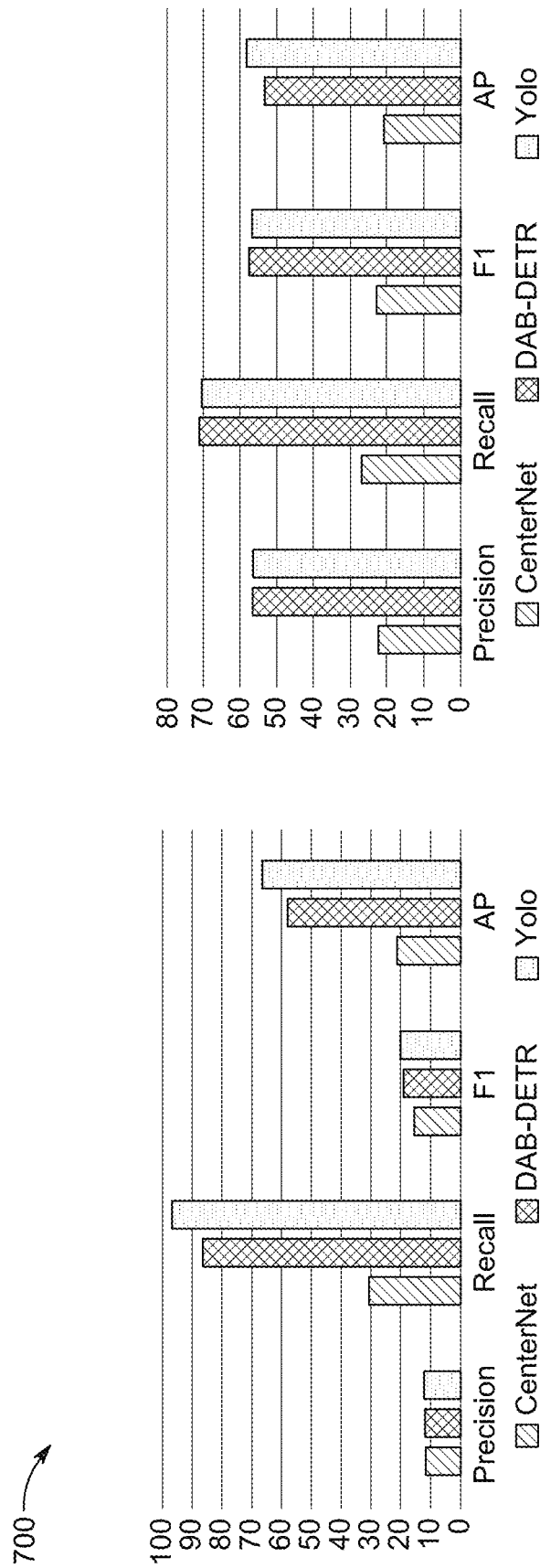
FIG. 7 illustrates the overall average Precision, Recall, F1-score, and mAP of Test Set II with varying confidence scores, according to an embodiment of the present disclosure.

FIG. 7 illustrates a graph 700 depicting the overall average Precision, Recall, F1-score, and mAP of Test Set II with varying confidence scores, according to an embodiment of the present disclosure. FIG. 7 provides a detailed analysis of the models' performance on the second test set, highlighting the balance between precision and recall for effective PPE compliance monitoring. The performance metrics are evaluated at different confidence levels to determine the models' effectiveness in real-world scenarios.

For evaluation measures other than AP, the best performance is achieved using PPE-YOLO for all objects detected (with a confidence threshold of 0.0), while PPE-DAB-Deformable-DETR reports the highest overall Precision, Recall, and F1 in case of detecting objects with a confidence threshold of 0.3, as shown in FIG. 7.

The highest results in terms of AP score are obtained when considering all detected objects with a confidence threshold of 0.0. That means the reported APs with a confidence threshold of 0.0 is larger than the reported APs with a confidence threshold of 0.3, in all cases except for the NoHelmet class for the Test Set II using PPE-CenterNet, which is not be affected by the confidence. However, the drop in terms of APs is either significant or insignificant. As can be seen in Table 4, there is an insignificant drop in AP using the evaluated confidence thresholds for the CenterNet-based model. This is affected by the FP evaluation measure reported using the evaluated object detection techniques in Tables 4, 5, and 6, such that the FPs of transformer-based models are much higher than the FPs of CenterNet-based models, for all cases which are followed by YOLO-based models.

Conversely, the performance of the generated models in terms of Precision significantly increases with the confidence threshold of 0.3 compared with the confidence threshold of 0.0, in all cases. The overall average improvements of Precision score are approximately 5% and 11% in the case of the CenterNet-based model for Test Set I and Test Set II, respectively, and approximately 50% in the case of the Transformer-based model for both Test Set I and Test Set II. Similarly, the Precision score is also significantly improved by around 50% for Test Set I and by 45% for Test Set II.

Like the AP score, the Recall score decreases for both test datasets when increasing the confidence. However, the drops are more significant for the Transformer-based and YOLO-based models than the CenterNet-based models. The overall average of Recall obtained using the CenterNet-based model appears stable for Test Set I and decreases from 30.81% to 27.22% when increasing the confidence. On the other hand, the obtained overall average of Recall using the Transformer-based model notably decreases from 78.98% to 72.79% for Test Set I and from 86.63% to 71.07% for Test Set II. This is also the case for YOLO-based models, in which the reported overall average of Recall dramatically decreases by 10% for Test Set I and by approximately 27% for Test Set II. Because the Precision score is dramatically improved when increasing the confidence compared to the drop of Recall, F1 also improves when increasing the confidence for all classes and for both test sets.

The improvements in F1 score are much more significant for Transformer-based and YOLO-based models, while it is not as significant in the case of CenterNet-based models, especially for Test Set I. That means anchor-free models are insensitive to the confidence score, and most of the objects are detected with high confidence scores. However, PPE-DAB-Deformable-DETR and PPE-YOLO are affected by the confidence scores, and many objects are detected with low confidence scores. The models of the present disclosure have been evaluated using two different test sets to evaluate the generalizability of the evaluated object detection techniques. Both test sets are from videos different from those used for training and validation. However, Test Set I belongs to Video 2 which is from the same angle as Video 1 at different times, while Test Set II is completely recorded from a different angle and in a different work environment which is more challenging. This is why the results obtained from Test Set I are much higher than those obtained from Test Set II for all assessed techniques. As can be seen in Tables 4, 5, and 6, the highest results in terms of Precision, Recall, F1, and mAP are obtained using PPE-YOLO, while the lowest results are obtained using PPE-CenterNet. For the Helmet and the NoVest classes, PPE-DAB-Deformable-DETR reports higher results for the most challenging dataset (Test Set II) than Test Set I, especially for AP and Recall in case of all detections with the confidence threshold of 0.0 and for all evaluation measures in case of detections with the confidence threshold of 0.3. The number of parameters of the generated models using PPE-CenterNet, PPE-DAB-Deformable-DETR, and PPE-YOLO is approximately 5 million, 47 million, and 36.5 million, respectively.

Figure 8:
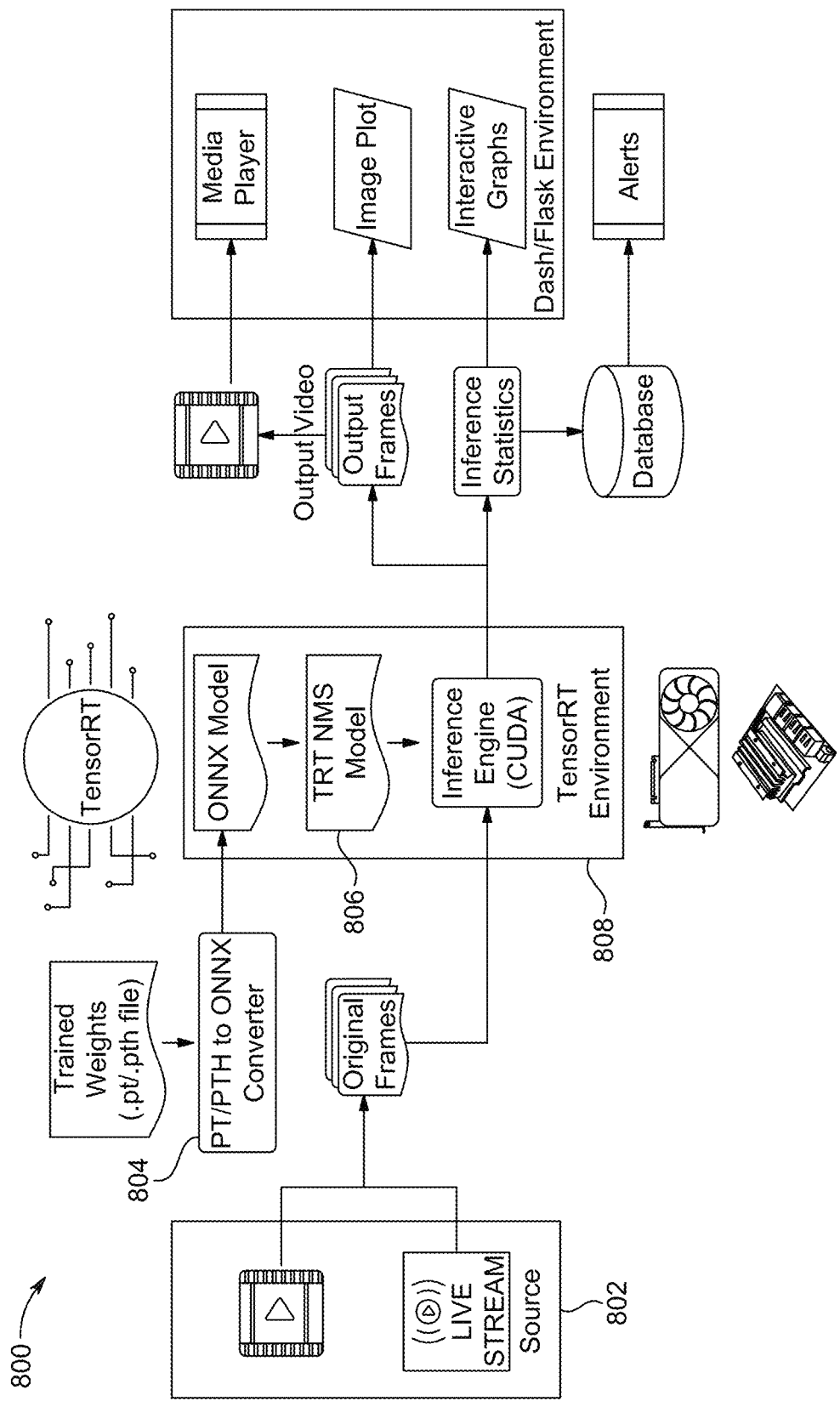
FIG. 8 illustrates a detailed block diagram of the real-time inference engine system designed for monitoring personal protective equipment (PPE) compliance, according to an embodiment of the present disclosure.

FIG. 8 illustrates the real-time inference engine system 800 designed for monitoring personal protective equipment (PPE) compliance, according to an embodiment of the present disclosure. The real-time inference engine system 800 outlines the flow of video data taking original frames coming directly from the camera or extracted from the input video file, processing these frames using the inference engine, and then generating the output frames as well as statistics for PPE detection to be shown in a web-based dashboard. The system architecture as depicted by the real-time inference engine system 800 includes input sources 802 which may be both the recorded video file and the camera stream as a direct source of the original frames extracted for inferencing. In some aspects, the system may be configured to handle different types of video frames that can be fed to the storage device. These video frames may include first video frames and second video frames. The first video frames may be captured by an input device, such as a camera or a video recorder, and fed to the storage device. The input device may be located in a preparatory area of the worksite, where workers prepare for their tasks and don their PPE. The first video frames may capture the workers in this preparatory area, providing a reference for the PPE compliance monitoring process. The second video frames may be captured by a plurality of cameras connected to the processor. These cameras may be located in an operations area of the worksite, where the workers perform their tasks. The second video frames may capture the workers in this operations area, providing real-time data for the PPE compliance monitoring process. The cameras may be configured to wirelessly transmit the second video frames to the storage device, allowing for continuous and uninterrupted monitoring of PPE compliance. In some embodiments the cameras may include a face level camera and a complete body camera, The face level camera is preferably mounted flush with the wall at a height of approximately 1-2 m. When mounted flush to the wall, the face level camera does not project outwardly from the wall. In this configuration the camera may be discreetly mounted in an area where a worker may check into a job site before starting work duties. For example, the face level camera may be mounted in an area proximal to a security checkpoint or automated reader of security badges, or in another location where workers commonly must face forward for administrative and or critical job task. The face level camera is thereby mounted ergonomically to take advantage of natural human behavior and movement prior to entering a job site. The face level camera is preferably configured to capture a full frontal image of the face, neck and at least a portion of the upper torso of an individual.

The complete body camera is preferably mounted proximal to but separately from the face level camera. In a preferred embodiment the complete body camera is mounted on the same wall as the face level camera with an extension such that the complete body camera is at a position higher than the face level camera and at a distance of at least 1 m, preferably 1.5-5 m distance, from the wall. A mounting system connected to the wall which permits elevation of the complete body camera away from the surface of the wall and suspended above the area surrounding the face level camera is preferred. The full body camera is configured to capture a full body image of a worker, preferably at a point near in time to the time at which the face level image of the worker is captured. Additionally, the complete body camera is positioned such that when a worker turns away from the face level camera, the body level camera may obtain a complete full frontal image of the worker. In some cases, the first and second video frames may be pre-recorded videos, real-time videos from the plurality of cameras, or a combination thereof. The pre-recorded videos may provide a historical record of PPE compliance at the worksite, while the real-time videos may provide up-to-date information on the current state of PPE compliance. The combination of pre-recorded and real-time videos may provide a comprehensive view of PPE compliance at the worksite, enabling the system to detect and respond to PPE compliance violations in a timely manner.

These input frames are pre-processed depending on the input source (video or camera) in a separate thread; the processed frames are then saved in a shared queue as input (IQueue) to the inference engine. The pre-processing may include operations such as resizing, normalizing, or augmenting the input frames. The system may also be configured to process the plurality of input frames at a rate of at least 15 frames per second (FPS), providing real-time monitoring capabilities. In other cases, the system may be configured to process the plurality of input frames at a rate of at least 28 FPS or even at a rate of at least 30 FPS, providing even faster real-time monitoring capabilities.

The input frames are then input into a PTP/ONNX Converter, as depicted in block 804, which utilizes pretrained model weights to produce an ONNX Model suitable for real-time inference. In an example, the PyTorch model checkpoint is converted to the ONNX model including the NMS parameters. This will eliminate the boxes which have low confidence or do not have objects and keep the most representative ones.

The ONNX Model is subsequently processed by a TRT-NMS Model Converter 806, which converts the model into a TensorRT Inference Engine 808 format that is compatible with the CUDA environment for accelerated GPU processing. In an example, the ONNX model is converted to a TensorRT model with the NMS plugin enabled for inference result. The inference engine 808 is responsible for analyzing the incoming video frames, applying the PPE detection and classification algorithms to identify and annotate PPE compliance in the video stream. The inference engine 808 employs the TensorRT model to read the original frames from the IQueue one by one, asynchronously transferring the frame from host memory to GPU memory while running model inference on each frame. This will overlap the model inferencing with the memory transfer to hide the GPU memory latency. Once the input frames are loaded into the inference engines, the inference threads may process the pre-processed input frames to obtain an annotation. The annotation may include information about the detected PPE in the input frames, such as the type of PPE, its location in the frame, and its compliance status. The processed frames with the annotation may then be enqueued to an output queue by the inference threads. The output threads may dequeue the processed frames with the annotation from the output queue and generate an output file.

The output from the inference engine 808 consists of two main components: the video frames with overlaid PPE annotations and the inference statistics. The output file may comprise the processed frames and the annotation, providing a comprehensive record of the PPE compliance monitoring process. After generating the output file, the input threads, inference threads, and output threads may be destroyed. This may free up system resources and prepare the system for the next cycle of PPE compliance monitoring.

The annotated video frames are directed to a media player for real-time display, allowing safety personnel or system users to visually monitor PPE compliance as it occurs on the worksite. Simultaneously, the inference statistics, which may include detection confidence scores, the number of PPE items detected, and compliance rates, are presented in an interactive dashboard environment. This dashboard serves as a central interface for system interaction, providing tools for alert management, data storage, and retrieval from a connected database. It also manages the generation and dissemination of alerts, ensuring that any PPE compliance violations are promptly communicated to the relevant parties.

The output frames are then saved in another shared queue as output (OQueue). Once the input frames are processed by the trained model, the processed frames with the annotation may be enqueued to an output queue by the inference threads. The output queue may serve as a buffer, storing the processed frames until they are ready to be transferred to the web-based dashboard for presentation. The enqueueing process may be performed concurrently with the processing of the input frames, allowing for efficient and real-time monitoring of PPE compliance. Additionally, a text file is generated for each output frame with the final boxes, scores, and detected class of the PPE object. This file is used by the dashboard for overall stats visualization. The output file may be stored in the storage device for later analysis or review. In some cases, the output file may be transferred to the web-based dashboard for real-time presentation of the PPE compliance information.

The TensorRT inference engine 808 is capable of processing frames at the rate of 338.65 FPS on an NVIDIA RTX A6000 GPU. Table 7 shows the complete GPU specifications.

TABLE 7

GPU Specifications

| | |
|---|---|
| CUDA Driver/Runtime Version | 11.7 |
| CUDA Capability | 8.6 |
| Global Memory | 48 GB |
| CUDA Cores | 10752 (84 MP, 128 CUDA Cores/MP) |
| Shared Memory | 48 KB/block, 100 KB/MP |
| Number of Threads | 1024/block, 1536/MP |

However, the GPU specifications provided above had significant performance bottleneck in reading a frame, performing model inferencing, and generating the output frame in the sequence, limiting the overall FPS to 8.6.

Table 8 shows the rates of reading frames, model inferencing, and generating output frames:

TABLE 8

Performance Bottleneck in the Inferencing Process

| | FPS |
|---|---|
| Input Frames | 28.54 |
| Inferencing | 338.65 |
| Output Frames | 122.08 |

The multi-threaded model inference architecture of the present disclosure overlaps the three steps (input, inferencing, output) to increase the throughput of the overall system. In other words, in some aspects, the system may be configured to concurrently perform the loading, processing, and generating operations. This may allow for efficient and real-time monitoring of PPE compliance, as the system does not have to wait for one operation to complete before starting the next one. This concurrent operation may be facilitated by the multi-threaded architecture of the system, which allows for multiple operations to be performed simultaneously. Furthermore, it overlaps the communication with computation on the GPU by asynchronous memory transfers between the host system memory and the GPU memory. This improves the overall performance to 28.65 FPS with minimal system resource utilization. Table 9 shows the overall resource utilization to process a complete video stream of approximately 30 secs.

TABLE 9

Overall System Resource Utilization

| | |
|---|---|
| CPU Maximum | 10.70% |
| CPU Memory | 12.07 GB |
| GPU Maximum | 8% |
| GPU Memory | 1.44 GB |

In some cases, the system may be configured to handle a variety of PPE classes. The PPE classes may include Helmet, NoHelmet, Vest, and NoVest. The system may be trained to recognize and classify these PPE classes based on a database of training data. The training data may include a variety of examples of each PPE class, providing a comprehensive representation of the different types of PPE that may be encountered at a worksite. In some aspects, the system may be trained to alleviate a high-imbalanced class issue. This issue may arise when the distribution of PPE classes in the training data is not balanced, leading to biased predictions. To alleviate this issue, the system may be trained with a specific ratio of PPE classes. For instance, the system may be trained with a first ratio of the Helmet to the NoHelmet and a second ratio of the NoVest to the Vest less than three (3). This balanced training approach may help to ensure that the system can accurately detect and classify all PPE classes, regardless of their prevalence in the training data. This variation, referred to herein as Element B, may provide flexibility in the system's training process, accommodating different distributions of PPE classes in the training data.

Figure 9:
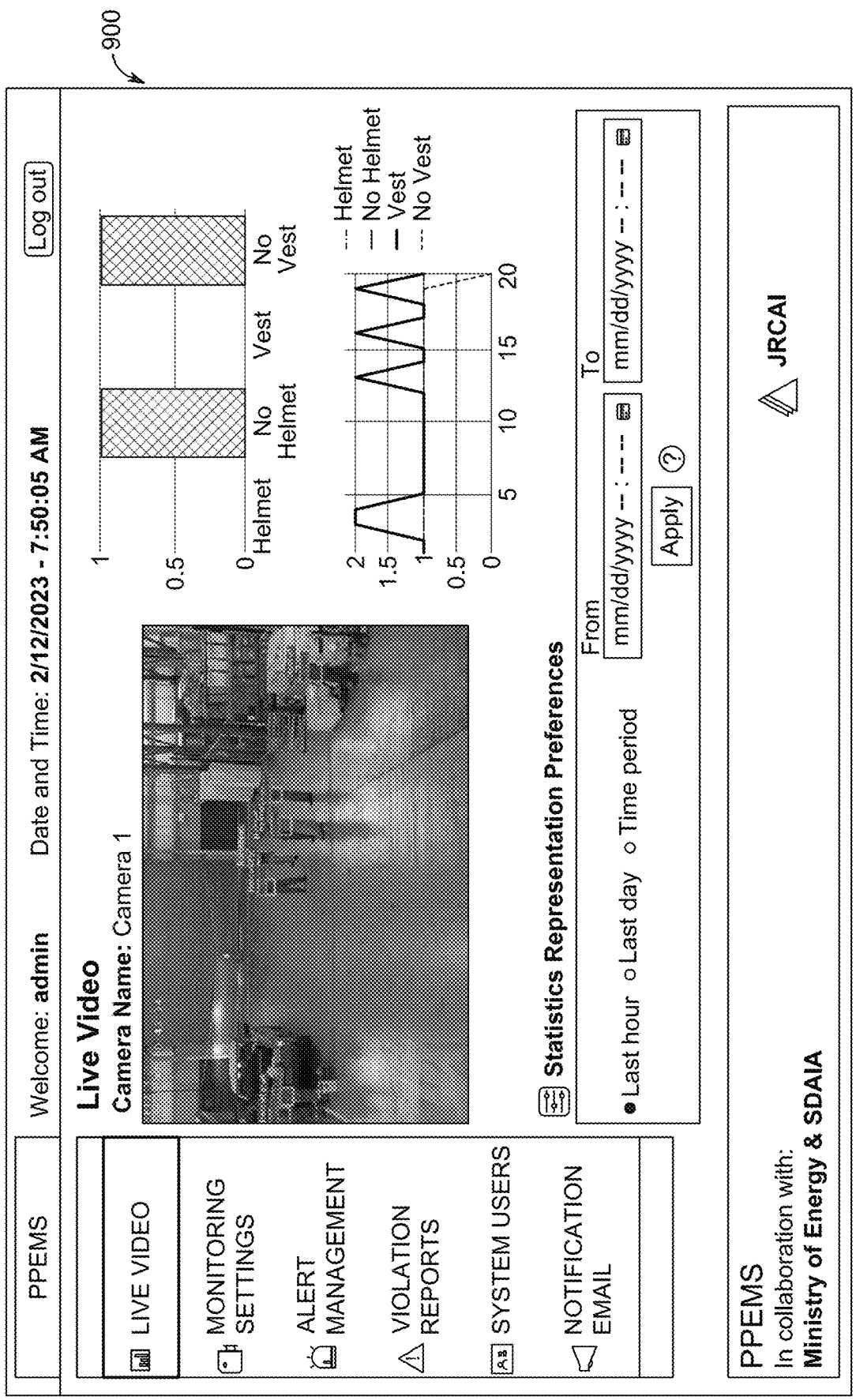
FIG. 9 illustrates a Live Video Tab, according to an embodiment of the present disclosure.

FIG. 9 illustrates a Live Video Tab 900, according to an embodiment of the present disclosure. The Live Video tab 900 is part of the web-based dashboard and is configured to display real-time video feeds from the plurality of cameras connected to the processor. The Live Video Tab 900 allows users, such as administrators, to monitor the current state of PPE compliance at the worksite as it happens. The Live Video Tab 900 also facilitates users to change the representation of the statistics in the line chart with three options: Last hour (by default), Last day, Specified time period.

FIG. 10 depicts a Monitoring Setting Tab 1000, according to an embodiment of the present disclosure. The Monitoring Setting Tab 1000 enables users, such as administrators, to configure various settings related to the monitoring of PPE compliance. Users may adjust parameters such as the selection of cameras, the definition of PPE compliance rules, and the setting of thresholds for alerts. In addition, the administrators may choose the camera that will be viewed in the live video tab, add a new camera or delete the existing camera, select the confidence percentage which measures how sure the model is, choose the PPE to monitor from the checkbox, and specify the working hours schedule.

FIG. 11 displays an Alert Management Tab 1100, according to an embodiment of the present disclosure. The Alert Management Tab 1100 is designed to provide users with a centralized interface for managing alerts generated by the system. Users can review, acknowledge, and track the status of alerts related to PPE compliance violations. Further, the administrators may set the alert system to send messages by either Threshold, Time, or both, using the Alert management Tab 1100. If the threshold is chosen, then the percentage and the time limit (how many minutes to wait before considering the situation as a violation) have to be chosen. If the time is chosen, then the time for the scheduled reporting email has to be chosen. The administrators may also add emails that will receive the alert messages and delete an email from the list of receivers.

Figure 12:
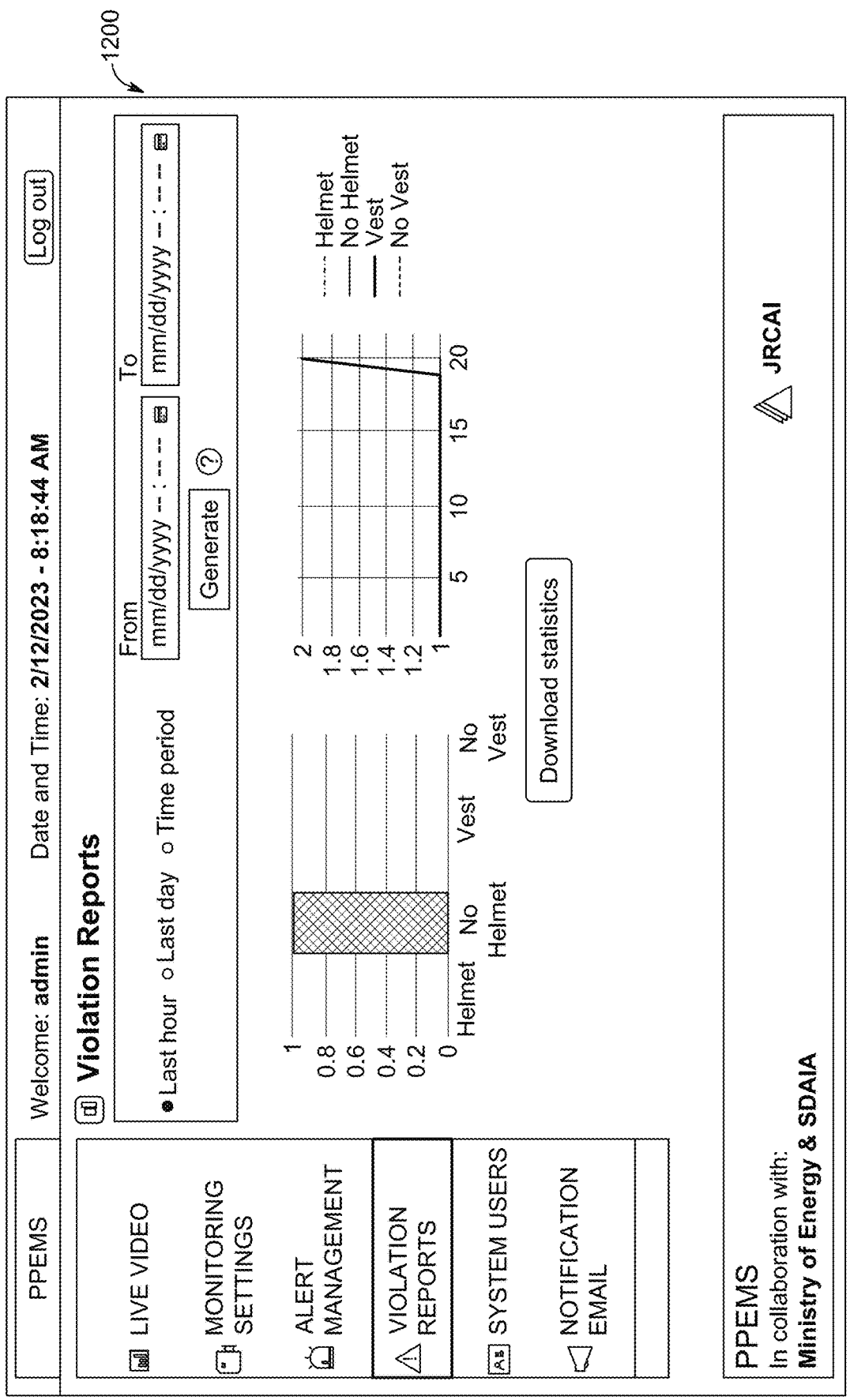
FIG. 12 presents a Violations Report Tab, according to an embodiment of the present disclosure.

FIG. 12 presents a Violations Report Tab 1200, according to an embodiment of the present disclosure. The Violations Report Tab 1200 tab compiles and displays reports on PPE compliance violations detected by the system. The reports may include details such as the time of the violation, the type of PPE that was not in compliance, and the identity of the worker if available. Using the Violations Report Tab 1200, the administrators may download an excel file with all the statistics.

Figure 13:
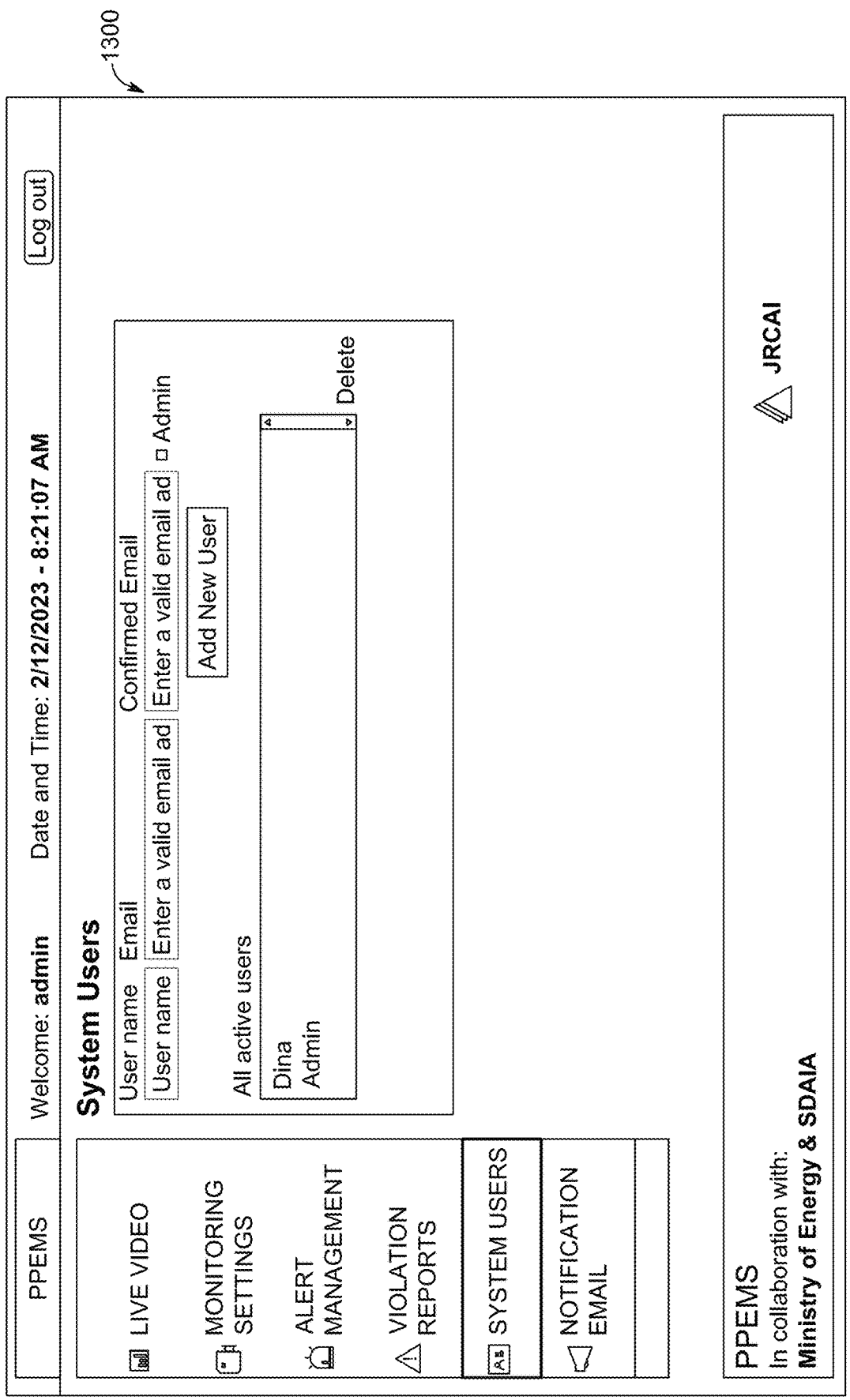
FIG. 13 depicts a System Users Tab, according to an embodiment of the present disclosure.

FIG. 13 depicts a System Users Tab 1300, according to an embodiment of the present disclosure. The System Users Tab 1300 allows for the management of user accounts within the PPE compliance monitoring system. Administrators can add, remove, or modify user accounts and define access levels for different users. The administrators may use the System Users Tab 1300 to add more users to the system and specify the account type while having a normal user account or admin account by checking or unchecking the "admin" checkbox. There will be an email sent to the user to choose his password. The administrators may delete a user from the active users' list by selecting the username and then pressing the "delete" button.

Figure 14:
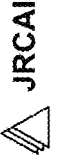
FIG. 14 shows a Notification Email Tab, according to an embodiment of the present disclosure.

FIG. 14 shows a Notification Email Tab 1400, according to an embodiment of the present disclosure. The Notification Email Tab 1400 is used to configure the email notification system of the PPE compliance monitoring system. For example, by default, there is a notification email for the dashboard. Users can set up email addresses to receive alerts, customize email templates, and define the conditions under which emails are sent. In addition, the administrators may use the Notification Email tab 1400 to change the notification email which is the email that will send the alert messages through the dashboard for the detected violations or for the frequent reports. The notification email is the email that sends the alert messages.

Figure 15:
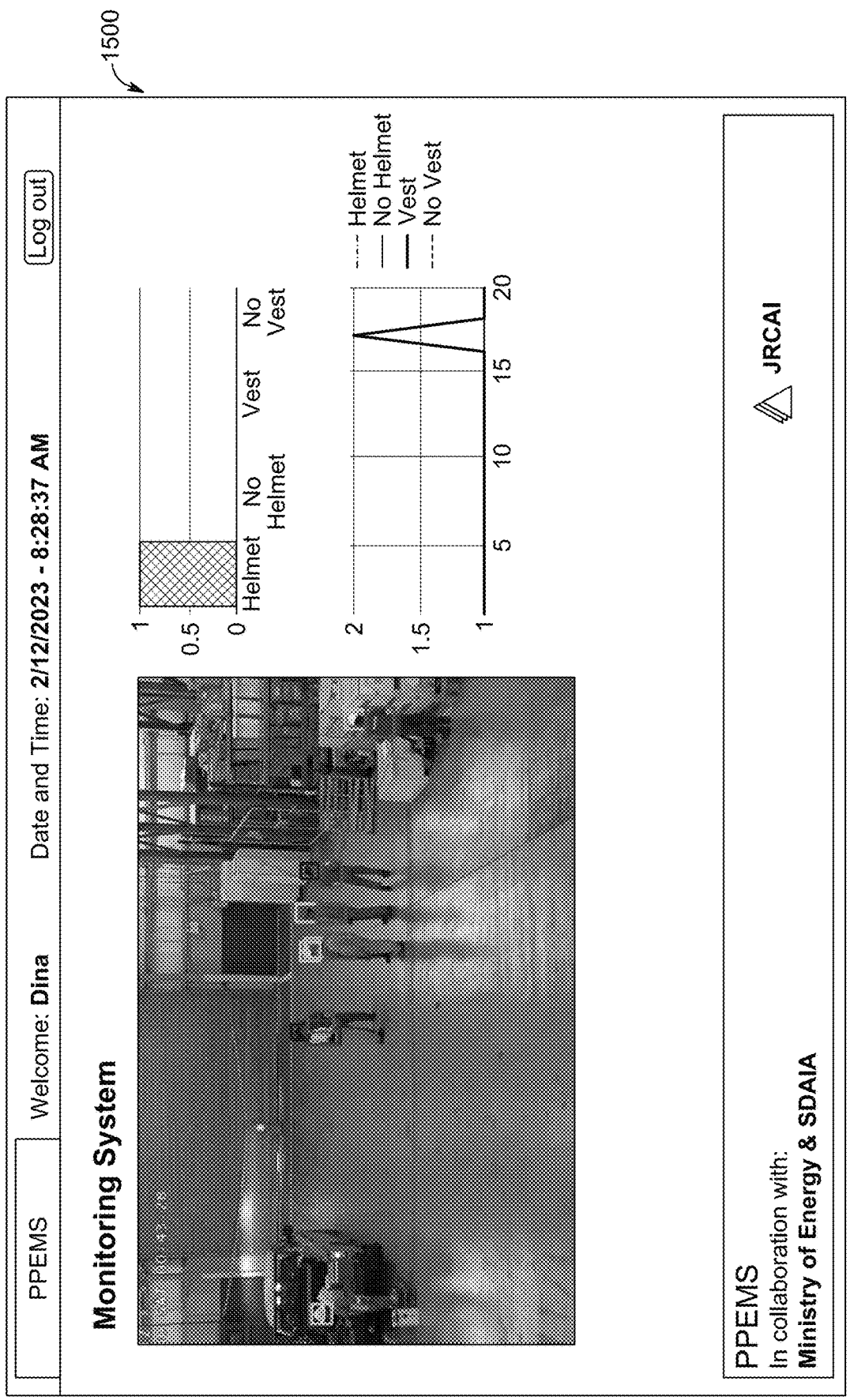
FIG. 15 illustrates a User Interface, according to an embodiment of the present disclosure.

FIG. 15 illustrates a User Interface 1500, according to an embodiment of the present disclosure. The User Interface 1500 provides a comprehensive view of the various functionalities offered by the PPE compliance monitoring system. The User Interface 1500 includes access to the Live Video Tab, Monitoring Setting Tab, Alert Management Tab, Violations Report Tab, System Users Tab, and Notification Email Tab, enabling users to interact with the system effectively. The User Interface 1500 is only one interface where the user can monitor the video stream from the camera and see the statistics.

Figure 16:
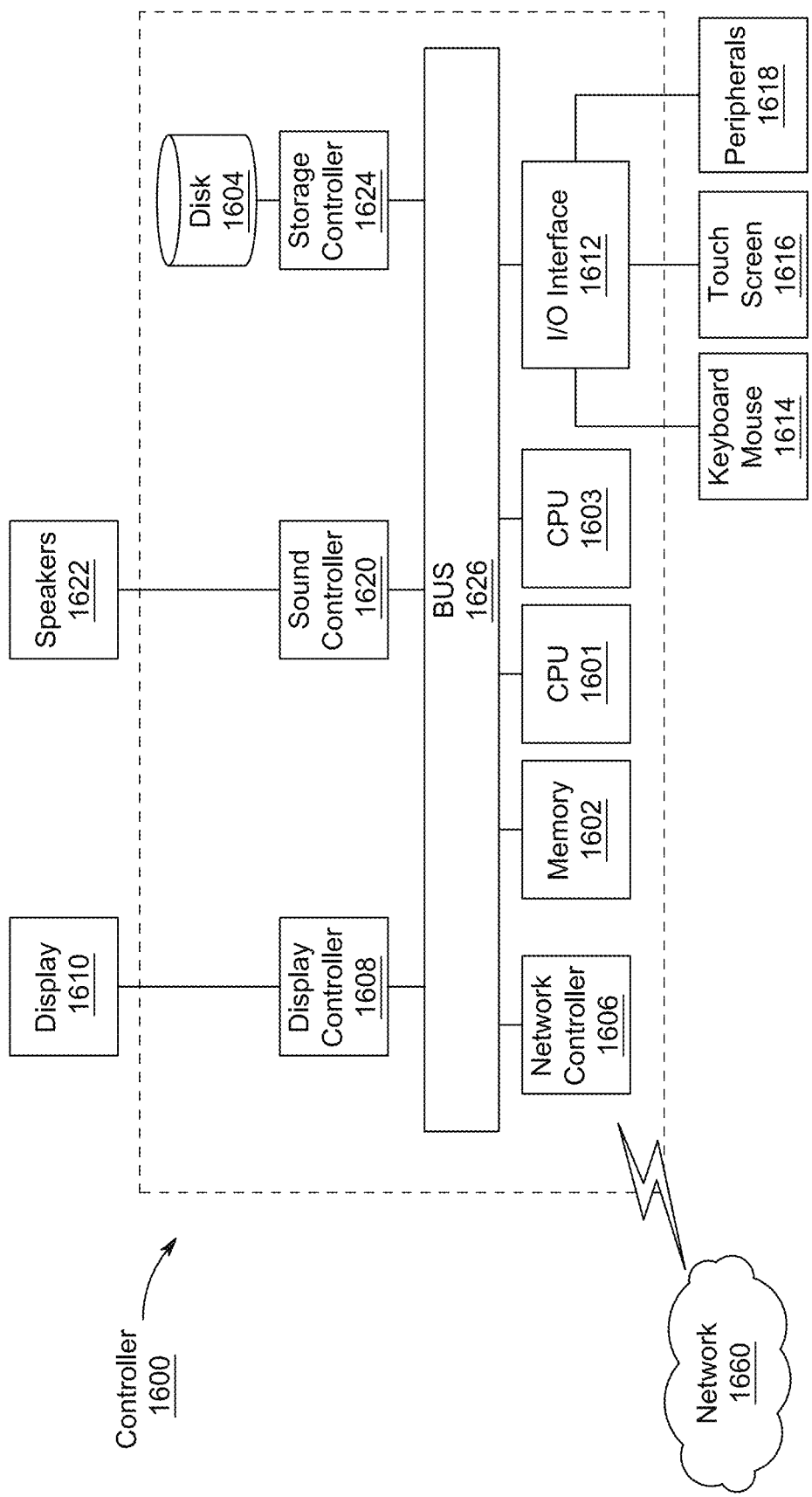
FIG. 16 is an illustration of a non-limiting example of details of computing hardware used in the computing system, according to certain embodiments.

Next, further details of the hardware description of the computing environment according to exemplary embodiments is described with reference to FIG. 16. In FIG. 16, a controller 1600 is described is representative of the real-time inference engine system 800 of FIG. 8 in which the controller is a computing device which includes a CPU 1601 which performs the processes described above/below. The process data and instructions may be stored in memory 1602. These processes and instructions may also be stored on a storage medium disk 1604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1601, 1603 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1601 or CPU 1603 may be a Xenon or Core processor from Intel of America or an Opteron processor from AMD of America, or may be other processor types that would be recognized by one of ordinary skill in the art. Alternatively, the CPU 1601, 1603 may be implemented on an FPGA, ASIC, PLD or using discrete logic circuits, as one of ordinary skill in the art would recognize. Further, CPU 1601, 1603 may be implemented as multiple processors cooperatively working in parallel to perform the instructions of the inventive processes described above.

The computing device in FIG. 16 also includes a network controller 1606, such as an Intel Ethernet PRO network interface card from Intel Corporation of America, for interfacing with network 1660. As can be appreciated, the network 1660 can be a public network, such as the Internet, or a private network such as an LAN or WAN network, or any combination thereof and can also include PSTN or ISDN sub-networks. The network 1660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a keyboard and/or mouse 1614 as well as a touch screen panel 1616 on or separate from display 1610. General purpose I/O interface also connects to a variety of peripherals 1618 including printers and scanners, such as an OfficeJet or DeskJet from Hewlett Packard.

A sound controller 1620 is also provided in the computing device such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the computing device. A description of the general features and functionality of the display 1610, keyboard and/or mouse 1614, as well as the display controller 1608, storage controller 1624, network controller 1606, sound controller 1620, and general purpose I/O interface 1612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 17.

Figure 17:
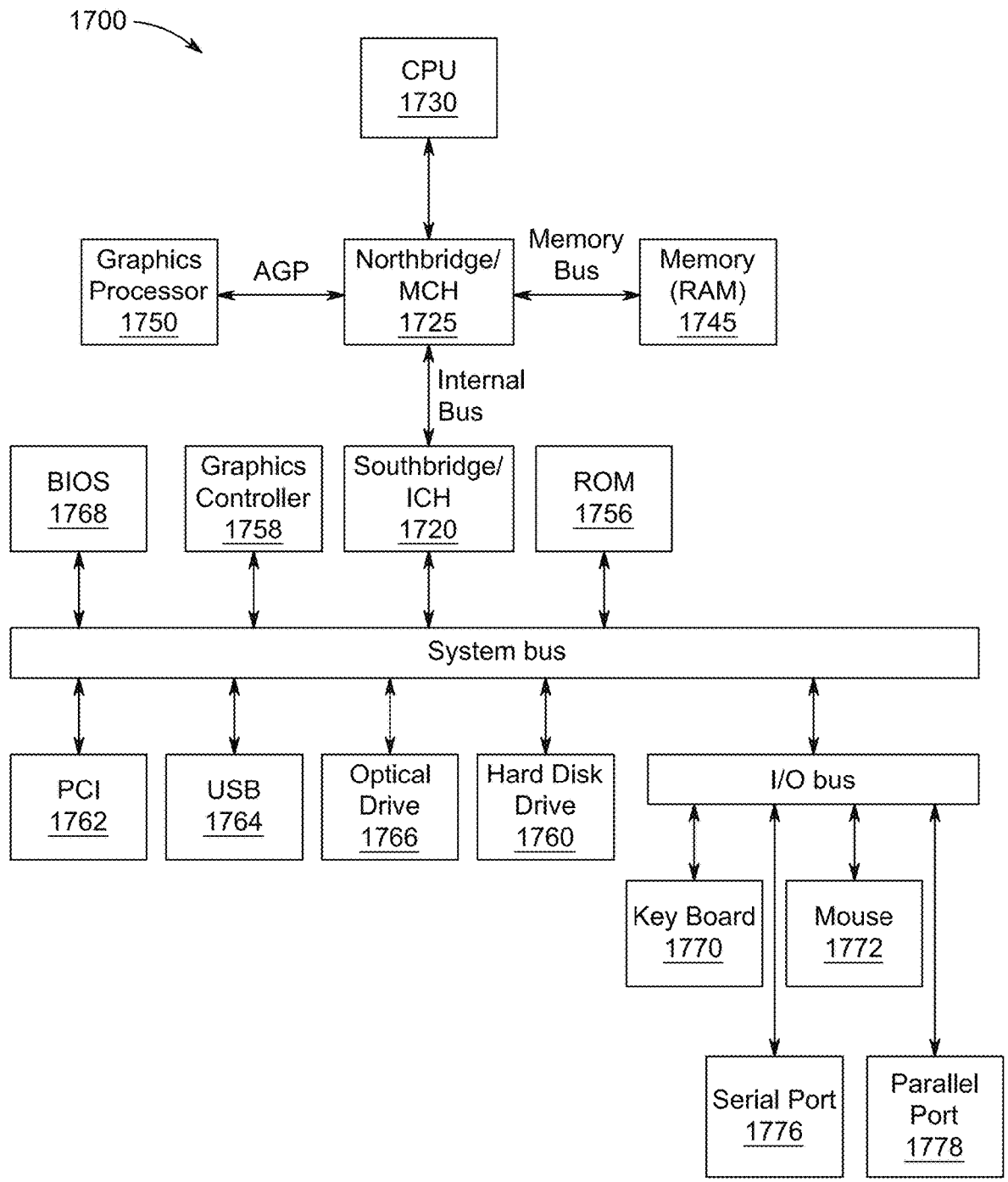
FIG. 17 is an exemplary schematic diagram of a data processing system used within the computing system, according to certain embodiments.

FIG. 17 shows a schematic diagram of a data processing system, according to certain embodiments, for performing the functions of the exemplary embodiments. The data processing system is an example of a computer in which code or instructions implementing the processes of the illustrative embodiments may be located.

In FIG. 17, data processing system 1700 employs a hub architecture including a north bridge and memory controller hub (NB/MCH) 1725 and a south bridge and input/output (I/O) controller hub (SB/ICH) 1720. The central processing unit (CPU) 1730 is connected to NB/MCH 1725. The NB/MCH 1725 also connects to the memory 1745 via a memory bus, and connects to the graphics processor 1750 via an accelerated graphics port (AGP). The NB/MCH 1725 also connects to the SB/ICH 1720 via an internal bus (e.g., a unified media interface or a direct media interface). The CPU Processing unit 1730 may contain one or more processors and even may be implemented using one or more heterogeneous processor systems.

Figure 18:
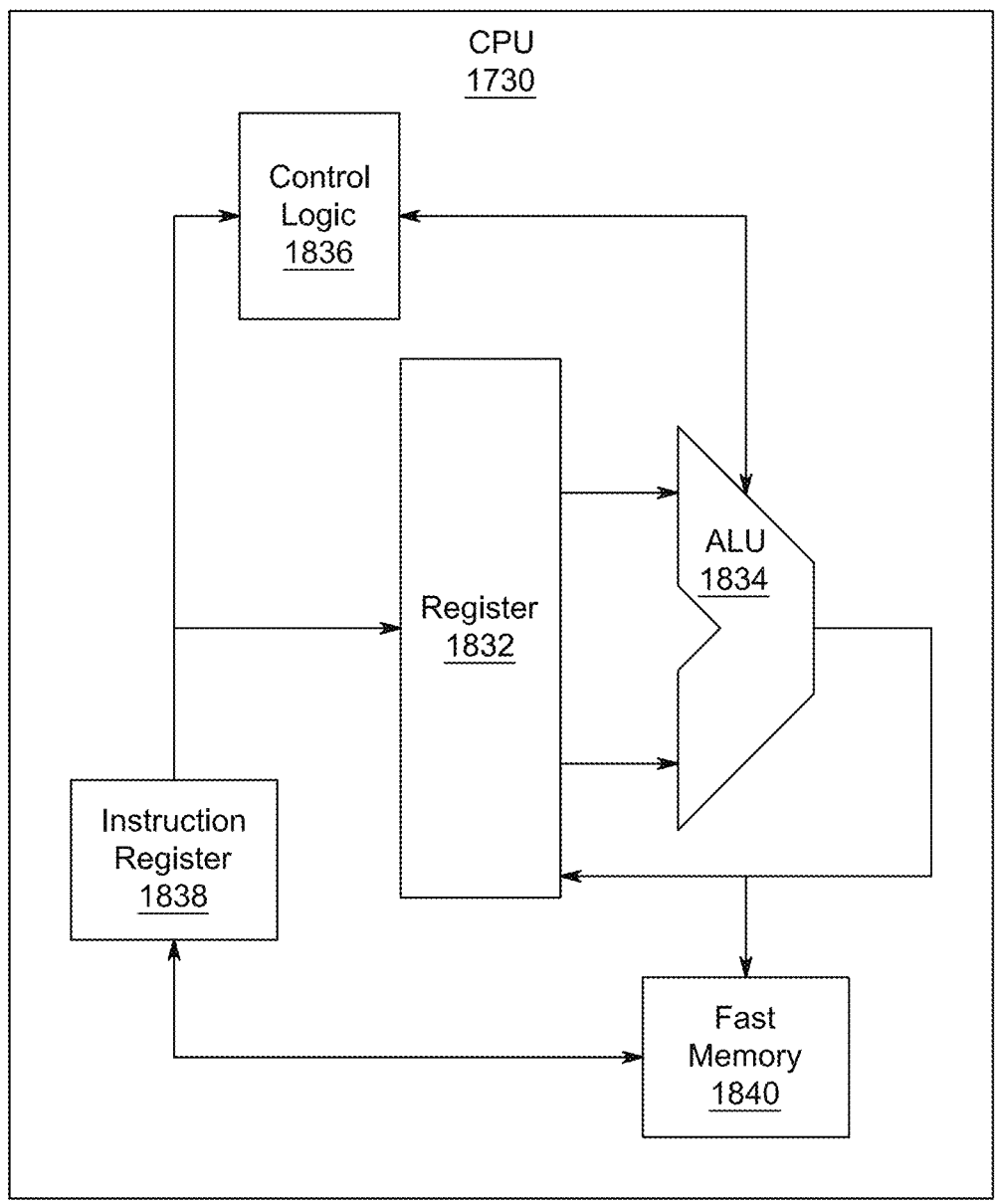
FIG. 18 is an exemplary schematic diagram of a processor used with the computing system, according to certain embodiments.

For example, FIG. 18 shows one implementation of CPU 1730. In one implementation, the instruction register 1838 retrieves instructions from the fast memory 1840. At least part of these instructions are fetched from the instruction register 1838 by the control logic 1836 and interpreted according to the instruction set architecture of the CPU 1730. Part of the instructions can also be directed to the register 1832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1834 that loads values from the register 1832 and performs logical and mathematical operations on the loaded values according to the instructions. The results from these operations can be feedback into the register and/or stored in the fast memory 1840. According to certain implementations, the instruction set architecture of the CPU 830 can use a reduced instruction set architecture, a complex instruction set architecture, a vector processor architecture, a very large instruction word architecture. Furthermore, the CPU 1730 can be based on the Von Neuman model or the Harvard model. The CPU 1730 can be a digital signal processor, an FPGA, an ASIC, a PLA, a PLD, or a CPLD. Further, the CPU 1730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 17, the data processing system 1700 can include that the SB/ICH 1720 is coupled through a system bus to an I/O Bus, a read only memory (ROM) 1756, universal serial bus (USB) port 1764, a flash binary input/output system (BIOS) 1768, and a graphics controller 1758. PCI/PCIe devices can also be coupled to SB/ICH 1788 through a PCI bus 1762.

The PCI devices may include, for example, Ethernet adapters, add-in cards, and PC cards for notebook computers. The Hard disk drive 1760 and CD-ROM 1766 can use, for example, an integrated drive electronics (IDE) or serial advanced technology attachment (SATA) interface. In one implementation the I/O bus can include a super I/O (SIO) device.

Further, the hard disk drive (HDD) 1760 and optical drive 1766 can also be coupled to the SB/ICH 1720 through a system bus. In one implementation, a keyboard 1770, a mouse 1772, a parallel port 1778, and a serial port 1776 can be connected to the system bus through the I/O bus. Other peripherals and devices that can be connected to the SB/ICH 1720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 19:
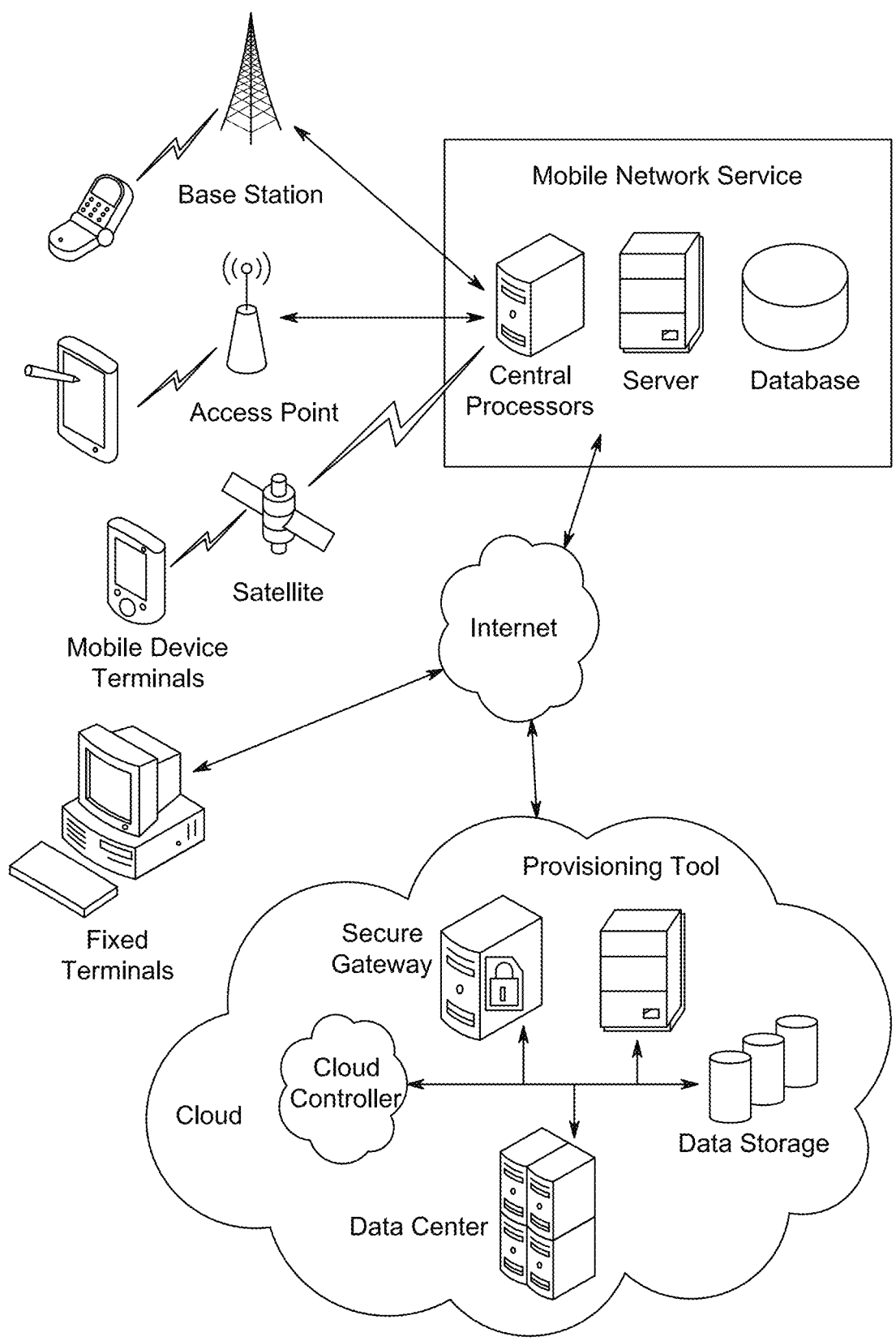
FIG. 19 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 19, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

A number of implementations have been described. Nevertheless, it will be understood that various modifications may be made without departing from the spirit and scope of the disclosure. Accordingly, other implementations are within the scope of the following claims.

The invention claimed is:

1. A system for real-time personal protective equipment (PPE) compliance monitoring at a worksite, the worksite including (1) a preparatory area where workers put on PPE and (2) an operations area where the workers are required to perform tasks while wearing the PPE, the system comprising:
    a processor configured to execute a computer instruction;
    a host memory connected to the processor;
    a graphical processing unit (GPU) connected to the processor;
    a GPU memory connected to the GPU;
    a storage device connected to the processor;
    an input device positioned in the preparatory area, and configured to feed first video frames to the storage device;
    a plurality of cameras positioned in the operations area, and configured to feed second video frames to the storage device; and
    a display device connected to the processor;
    wherein:
    the processor loads a trained model on the GPU to configure the GPU as a PPE compliance inference engine,
    by concurrently operating a plurality of input threads, a plurality of inference threads, and a plurality of output threads, the GPU applies the trained model to determine PPE compliance statuses of the workers in the operations area,
    the plurality of input threads include:
        performing preprocessing on the first and second video frames, the preprocessing including at least one operation selected from video frame resizing, video frame normalizing, and video frame augmenting, and
        enqueuing the pre-processed first and second video frames to form an input queue,
    the plurality of inference threads include:
        dequeuing the pre-processed first and second video frames from the input queue, and
        using the pre-processed first video frames as reference video frames, applying the trained model to identify PPE in the pre-processed second video frames,
        based on an identifying result, generating PPE annotations for the pre-processed second video frames, and
        enqueuing the pre-processed second video frames with the PPE annotations overlaid thereon to form an output queue,
    the plurality of output threads include:
        dequeuing the pre-processed second video frames with the PPE annotations overlaid thereon from the output queue, and
        generating an output file including (1) the pre-processed second video frames with the PPE annotations overlaid thereon, and (2) PPE compliance statistics,
    the display device is configured to, based on the output file, present via a web-based dashboard interface to a user of the system, the PPE compliance statuses of the workers in the operations area.

2. The system of claim 1,
    wherein the preparatory area is enclosed by at least three vertical walls and a roof,
    wherein the input device comprises a first set of cameras configured to capture the first video frames and transmit the first video frames to the storage device, wherein the first set of cameras includes a face level camera and a complete body camera, wherein both the face level camera and the complete body camera are mounted on one wall of the least three vertical walls of the preparatory area;
    wherein the operations area is proximal to, adjacent or open to the preparatory area, wherein the plurality of cameras are configured to capture working video frames of workers in the operations area and transmit the working video frames as the second video frames to the storage device, wherein the plurality of cameras include a field view camera and at least one area camera.

3. The system of claim 1, wherein each video frame of the first and second video frames is asynchronously transferred from the host memory to the GPU memory.

4. The system of claim 1, wherein the plurality of inference threads further include:
   running the trained model with each video frame of the pre-processed second video frames on the GPU to generate the pre-processed second video frames with a plurality of bounding boxes, and
   enqueuing the pre-processed second video frames with the plurality of bounding boxes to form the output queue.

5. The system of claim 1, wherein the PPE compliance statistics include one or more of PPE inference confidence scores, a number of PPE items identified, and PPE compliance rates among the workers.

6. The system of claim 1, wherein the first and second video frames are selected from the group consisting of a pre-recorded video, a real-time video from the plurality cameras, and a combination thereof.

7. The system of claim 1, wherein the trained model is selected from the group consisting of a PPE-CenterNet, a PPE-DAB-Deformable-DETR, and a PPE-YOLO.

8. The system of claim 7, wherein the trained model is the PPE-YOLO.

9. The system of claim 1, wherein a PPE class is defined as including Helmet, NoHelmet, Vest, and NoVest and wherein the trained model is trained by a database with a first ratio of the Helmet to the NoHelmet and a second ratio of the NoVest to the Vest less than three (3) to alleviate a high-imbalanced class issue.

10. The system of claim 1, wherein the system processes the first and second video frames with a rate of at least 15 frames per second (FPS).

11. The system of claim 10, wherein the system processes the first and second video frames with a rate of at least 28 frames per second (FPS).

12. A method for real-time personal protective equipment (PPE) compliance monitoring at a worksite, the worksite including (1) a preparatory area where workers put on PPE and (2) an operations area where the workers are required to perform tasks while wearing the PPE, the method comprising:
   obtaining first video frames via an input device positioned in the preparatory area;
   obtaining second video frames via a plurality of cameras positioned in the operations area;
   loading a trained model on a graphical processing unit (GPU), such that the GPU applies the trained model to determine PPE compliance statuses of the workers in the operations area by concurrently operating a plurality of input threads, a plurality of inference threads, and a plurality of output threads, wherein the plurality of input threads include:
      performing preprocessing on the first and second video frames, the preprocessing including at least one operation selected from video frame resizing, video frame normalizing, and video frame augmenting, and
      enqueuing the pre-processed first and second video frames to form an input queue,
   the plurality of inference threads include:
      dequeuing the pre-processed first and second video frames from the input queue, and
      using the pre-processed first video frames as reference video frames, applying the trained model to identify PPE in the pre-processed second video frames,
      based on an identifying result, generating PPE annotations for the pre-processed second video frames, and
      enqueuing the pre-processed second video frames with the PPE annotations overlaid thereon to form an output queue, and
   the plurality of output threads include:
      dequeuing the pre-processed second video frames with the PPE annotations overlaid thereon from the output queue, and
      generating an output file including (1) the pre-processed second video frames with the PPE annotations overlaid thereon, and (2) PPE compliance statistics, and
   based on the output file, presenting the PPE compliance statuses of the workers in the operations area, via a web-based dashboard interface on a display device.

13. The method of claim 12, wherein the plurality of inference threads further include:
   running the trained model with each video frame of the pre-processed second video frames on the GPU to generate the pre-processed second video frames with a plurality of bounding boxes, and
   enqueuing the pre-processed second video frames with the plurality of bounding boxes to form the output queue.

14. The method of claim 12, wherein the PPE compliance statistics include one or more of PPE inference confidence scores, a number of PPE items identified, and PPE compliance rates among the workers.

15. The method of claim 12, wherein the trained model is the PPE-YOLO.

16. The method of claim 12, wherein a PPE class is defined as including Helmet, NoHelmet, Vest, and NoVest and wherein the trained model is trained by a database with a first ratio of the Helmet to the NoHelmet and a second ratio of the NoVest to the Vest less than three (3) to alleviate a high-imbalanced class issue.

17. The method of claim 12, wherein the first and second video frames are processed with a rate of at least 30 frames per second (FPS).

* * * * *